(12) United States Patent
Hasburgh

(10) Patent No.: US 11,474,612 B2
(45) Date of Patent: Oct. 18, 2022

(54) APPLIANCE CONTROL USING E-FIELD GESTURE SENSOR MEASUREMENT

(71) Applicant: Sub-Zero, Inc., Madison, WI (US)

(72) Inventor: Colin M. Hasburgh, Stoughton, WI (US)

(73) Assignee: Sub-Zero Group, Inc., Madison, WI (US)

( * ) Notice: Subject to any disclaimer, the term of this patent is extended or adjusted under 35 U.S.C. 154(b) by 113 days.

(21) Appl. No.: 16/929,578

(22) Filed: Jul. 15, 2020

(65) Prior Publication Data
US 2021/0041956 A1  Feb. 11, 2021

Related U.S. Application Data

(60) Provisional application No. 62/883,762, filed on Aug. 7, 2019.

(51) Int. Cl.
| | | |
|---|---|---|
| *G06F 3/01* | (2006.01) | |
| *E05F 15/73* | (2015.01) | |
| *H05B 47/115* | (2020.01) | |

(52) U.S. Cl.
CPC ............. *G06F 3/017* (2013.01); *E05F 15/73* (2015.01); *H05B 47/115* (2020.01); *E05Y 2900/304* (2013.01); *E05Y 2900/306* (2013.01); *E05Y 2900/308* (2013.01); *E05Y 2900/31* (2013.01)

(58) Field of Classification Search
CPC ........ G06F 3/017; H05B 47/115; E05F 15/73; E05Y 2900/30–312
See application file for complete search history.

(56) References Cited

U.S. PATENT DOCUMENTS

| 2013/0099715 A1* | 4/2013 | Fuhge | E05F 15/79 318/484 |
| 2015/0145420 A1* | 5/2015 | Simonian | G06F 3/017 315/154 |
| 2021/0396461 A1* | 12/2021 | Cho | E05F 15/73 |

OTHER PUBLICATIONS

MICROCHIP GestIC® Design Guide, 2013-2015 Michrochip Technology Inc, Jul. 14, 2015; 53 pages.
(Continued)

*Primary Examiner* — Michael Pervan
(74) *Attorney, Agent, or Firm* — Bell & Manning, LLC

(57) ABSTRACT

A controller device is provided that includes an e-field sensor that includes a transmitter electrode formed of a first conductive material, an isolation layer formed of a dielectric material to at least partially cover the transmitter electrode, a first receive electrode formed on the isolation layer of a second conductive material, and a second receive electrode formed on the isolation layer of the second conductive material, wherein the second receive electrode is a mirror image of the first receive electrode on the isolation layer. A gesture performance by a user within a sensing area of the e-field sensor is detected by comparing a received first signal to a received second signal. When an appliance component is responsive to the detected gesture, a control signal is sent to the appliance component indicating that the appliance component perform an action associated with the detected gesture.

20 Claims, 20 Drawing Sheets

(56) References Cited

OTHER PUBLICATIONS

MICROCHIP MGC3030/3130 GestIC® Library Interface Description, 2013-2015 Microchip Technology Inc., Nov. 8, 2013, 62 pages.
MICROCHIP MGC3030 Woodstar Development Kit User's Guide, 2013-2014 Microchip Technology, Jul. 16, 2013, 45 pages.
MICROCHIP Aurea GUI User's Guide, 2018 Microchip Technology, 59 pages.
MICROCHIP MGC3030/3130 3D Tracking and Gesture Controller Data Sheet, 2012-2019 Microchip Technology Inc. 51 pages.

* cited by examiner

APPLIANCE CONTROL USING E-FIELD GESTURE SENSOR MEASUREMENT

CROSS-REFERENCE TO RELATED APPLICATIONS

The present application claims the benefit of 35 U.S.C. § 119(e) to U.S. Provisional Patent Application No. 62/883,762 filed on Aug. 7, 2019, the entire contents of which are hereby incorporated by reference.

BACKGROUND

Appliances including ovens, refrigerators, freezers, cooktops, ranges, dishwashers, coffee makers, grills, ventilation hoods, etc. include various user-controlled components. For example, most appliance include one or more handles that allow opening and/or closing of a door that provides access to an interior of the appliance. As another example, most appliance include one or more user interface components such as knobs, buttons, dials, levers, toggle switches, etc. that allow the user to control a performance aspect of the appliance. For example, a refrigerator may include an ice dispenser that is controlled by a lever or a mechanical push-button that opens an ice dispenser cap covering an ice dispensing chute to allow the dispensing of ice into a container. As another example, ovens, refrigerators, freezers, cooktops, ranges, and grills may include a temperature adjustment knob. As still another example, a ventilation hood may include a light intensity adjustment knob or switch and/or a fan speed adjustment knob or switch. The knobs, buttons, dials, levers, toggle switches, etc. use physical contact or force provided by the user to indicate the desired user function, which typically requires that the user not have another item in their hand. The knobs, buttons, dials, levers, toggle switches, etc. further clutter the appliance appearance and make cleaning of the appliance more difficult and tedious.

SUMMARY

In an example embodiment, an appliance is provided. The appliance includes, but is not limited to, a controller device and an appliance component. The controller device includes, but is not limited to, an electric field (e-field) sensor, a processor and a computer-readable medium operably coupled to the processor. The computer-readable medium has instructions stored thereon that, when executed by the processor, cause the controller device to provide a control signal to the appliance component. The e-field sensor includes, but is not limited to, a transmitter electrode formed of a first conductive material, an isolation layer formed of a dielectric material to at least partially cover the transmitter electrode, a first receive electrode formed on the isolation layer of a second conductive material, and a second receive electrode formed on the isolation layer of the second conductive material. The second receive electrode is a mirror image of the first receive electrode on the isolation layer. A transmit signal is sent to the transmitter electrode for the transmitter electrode to radiate. A first signal and a second signal are received from the first receive electrode and the second receive electrode in response to the radiated transmit signal. A gesture performed by a user within a sensing area of the e-field sensor is detected by comparing the received first signal to the received second signal. Whether the appliance component that the e-field sensor is selected to control is responsive to the detected gesture is determined. When the appliance component is responsive to the detected gesture, a control signal is sent to the appliance component indicating that the appliance component perform an action associated with the detected gesture and with the appliance component.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
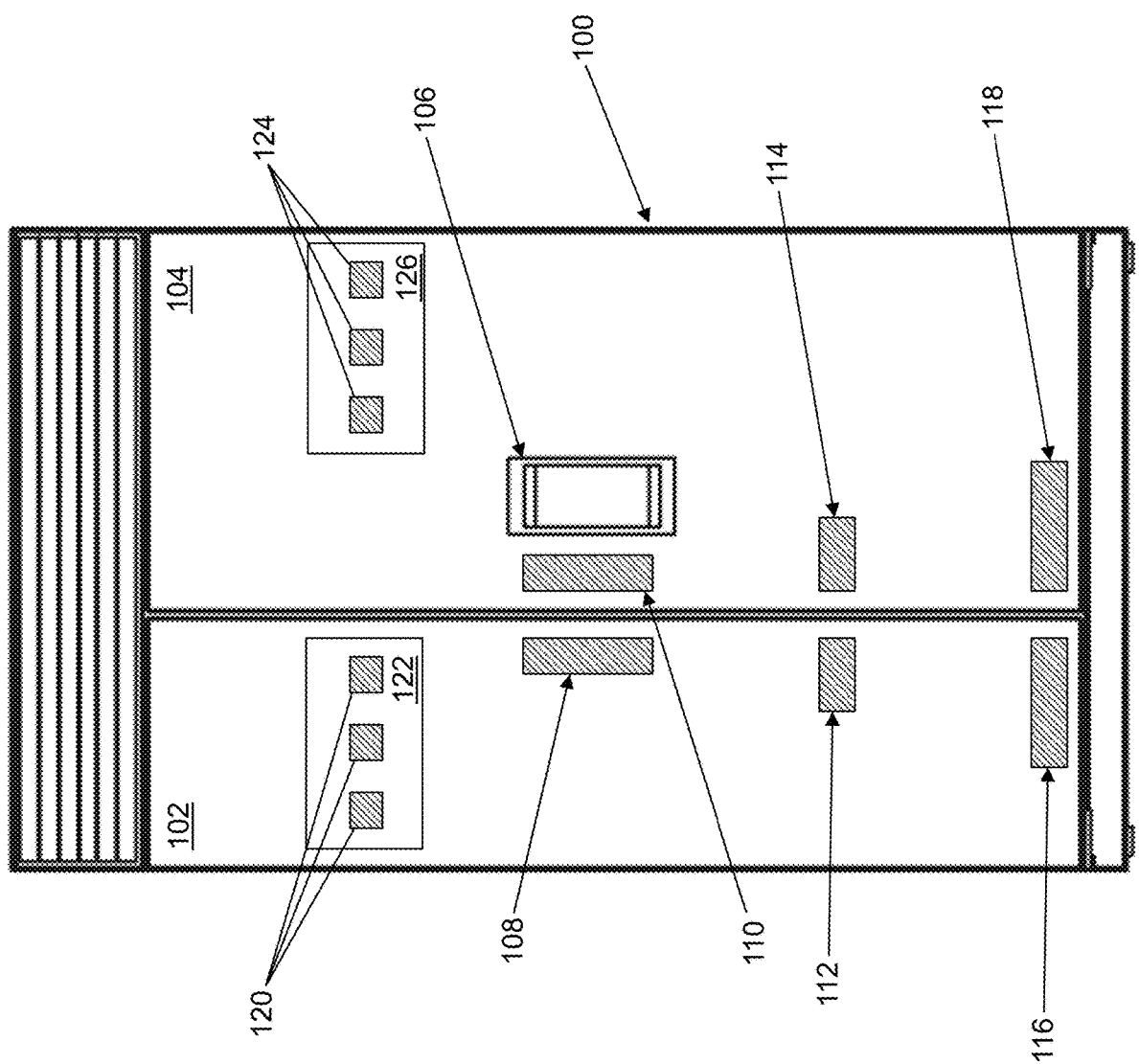
FIG. 1 depicts a refrigerator with a first plurality of electric field (e-field) sensor devices in accordance with an illustrative embodiment.

Referring to FIG. 1, a refrigerator 100 with a first plurality of electric field (e-field) sensor devices is shown in accordance with an illustrative embodiment. Refrigerator 100 is an illustrative appliance that includes one or more e-field sensors to control operation of an appliance component of the appliance. Inclusion of the one or more e-field sensors may result in an exterior of refrigerator 100 that is simplified and streamlined to remove protrusions from the exterior or interior and improve an appearance of the appliance, that allows the user to indicate a desired user function without physical contact with the appliance, that provides easier cleaning of the exterior or the interior of the appliance, and that allows user control of one or more appliance functions when the user is holding an object in their hands. Though shown on the exterior of refrigerator 100, one or more e-field sensor may be mounted in an interior of refrigerator 100 with similar effect. E-field sensors are not impacted by ambient influences such as light or sound that may negatively impact other sensor technologies.

As described further below, an e-field sensor device measures a change in an electric field that surrounds e-field sensor electrodes of the e-field sensor and, based on the measured changes in the electric field, determines whether a user is adjacent the e-field sensor electrodes, and, if so, what movement the user performs to determine whether a gesture by the user is requesting an action by an appliance controller. When the gesture is requesting an action by the appliance controller, the appliance controller provides an electrical signal such as a power signal or a data signal to an appliance component associated with the e-field sensor electrodes. The electrical signal may provide power to the appliance component to activate the appliance component or otherwise cause the appliance component to operate in a specified manner. For example, the electrical signal may turn on a light, increase or decrease a light intensity, wake up a display, turn on a burner, turn on a fan, increase or decrease a fan speed, open an ice dispenser cap to dispense ice, turn on a water dispenser to dispense water, raise or lower a temperature, change an operating mode of the appliance, trigger a door release and/or open, trigger a door close, change an operating time, turn on a status display, etc. Illustrative appliance components include a light, a fan, a water dispenser, an ice dispenser, an oven, cooktop, or range burner, a door opener, a door closer, a temperature control, an ice type control, an operating mode selector, etc. The appliance controller may send and/or receive the data signal to/from the one or more appliance components. The data signal may include any type of information and may be encoded in a communication signal in various manners as understood by a person of skill in the art.

Illustrative e-field sensor devices are those offered by Microchip Technology Inc. of Chandler, Ariz., USA. Each e-field sensor device may be designed such that it operates in the conditions to which the exterior or the interior space of the appliance is exposed and on which or within which the e-field sensor device is mounted such as the interior or exterior space of a freezer, of a refrigerator, of an oven, of a dishwasher, of a ventilation hood, of a grill, etc. Each e-field sensor device may be designed such that it detects one or more different gestures by a user in proximity to the e-field sensor electrodes of the respective e-field sensor device. Each e-field sensor device may be designed such that it detects each gesture from a user within a desired distance from the e-field sensor electrodes through a surface material of the appliance that is non-metallic and allows for e-field penetration.

In the illustrative embodiment, refrigerator 100 may include a freezer door 102, a refrigerator door 104, an ice and water dispenser 106, and the first plurality of e-field sensor devices. The components of refrigerator 100 may be formed of one or more materials, such as metal, glass, and/or plastic having a sufficient strength and rigidity to provide the illustrated and/or described function. The first plurality of e-field sensor devices may include a hand freezer door open sensor 108, a knee freezer door open sensor 112, and a foot freezer door open sensor 116 mounted on freezer door 102. For example, hand freezer door open sensor 108, knee freezer door open sensor 112, and foot freezer door open sensor 116 may be designed to detect an up vertical gesture to trigger opening of freezer door 102. Hand freezer door open sensor 108, knee freezer door open sensor 112, and foot freezer door open sensor 116 may be designed to detect a down vertical gesture to trigger closing of freezer door 102. The vertical gesture avoids possible false triggers that could result from horizontal motion due to a user walking past refrigerator 100.

The first plurality of e-field sensor devices further may include a hand refrigerator door open sensor 110, a knee refrigerator door open sensor 114, and a foot refrigerator door open sensor 118 mounted on refrigerator door 104. For example, hand refrigerator door open sensor 110, knee refrigerator door open sensor 114, and foot refrigerator door open sensor 118 may be designed to detect an up vertical gesture to trigger opening of refrigerator door 104. Hand refrigerator door open sensor 110, knee refrigerator door open sensor 114, and foot refrigerator door open sensor 118 may be designed to detect a down vertical gesture to trigger closing of refrigerator door 104.

The first plurality of e-field sensor devices further may include a plurality of freezer interface e-field sensors 120 included in a freezer interface 122 and a plurality of refrigerator interface e-field sensors 124 included in a refrigerator interface 126. For example, the plurality of freezer interface e-field sensors 120 may include a temperature e-field sensor designed to detect a gesture used to trigger viewing and/or changing of a temperature setting for a freezer of refrigerator 100, an ice type e-field sensor designed to detect a gesture used to trigger viewing and/or changing of an ice type setting for the freezer of refrigerator 100, a freezer mode e-field sensor designed to detect a gesture used to trigger viewing and/or changing of an operating mode setting for the freezer of refrigerator 100, a freezer light e-field sensor designed to detect a gesture used to trigger viewing and/or changing of an operation of an interior light for the freezer of refrigerator 100, etc. For example, the plurality of refrigerator interface e-field sensors 124 may include a temperature e-field sensor designed to detect a gesture used to trigger viewing and/or changing of a temperature setting for a refrigerated section of refrigerator 100, a refrigerated section mode e-field sensor designed to detect a gesture used to trigger viewing and/or changing of an operating mode setting for the refrigerated section of refrigerator 100, a refrigerated section light e-field sensor designed to detect a gesture used to trigger viewing and/or changing of operation of an interior light for the refrigerated section of refrigerator 100, etc.

Refrigerator 100 may include a fewer or a greater number of e-field sensors. A location, size, and shape indicated for each of the first plurality of e-field sensor devices is merely for illustration. As described further below, a size and shape for each of the first plurality of e-field sensor devices may be selected independently based on the gesture selected to trigger operation of the associated appliance component. The location for each of the first plurality of e-field sensor devices may be selected independently based on a user body part used to generate the gesture selected to trigger operation of the associated appliance component as well as a user interface location to support ease of use and manufacture.

Figure 2:
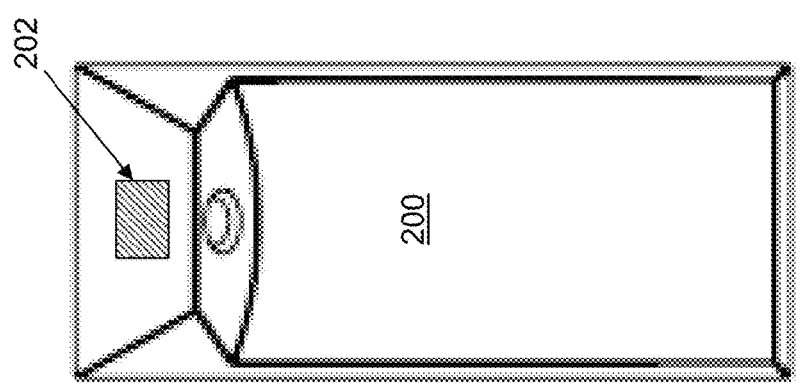
FIG. 2 depicts a water dispenser with an e-field sensor device in accordance with an illustrative embodiment.

Referring to FIG. 2, a water dispenser 200 with an e-field sensor device 202 is shown in accordance with an illustrative embodiment. E-field sensor device 202 may be designed to detect a gesture that triggers dispensing of water by water dispenser 200 and that triggers cessation of the dispensing of water by water dispenser 200. For example, e-field sensor device 202 may be designed to detect placement of a hand in front of e-field sensor device 202 for a predefined period of time to trigger dispensing of water by water dispenser 200. For example, e-field sensor device 202 may be designed to detect removal of the hand in front of e-field sensor device 202 to trigger cessation of the dispensing of water by water dispenser 200. Water dispenser 200 may include a greater number of e-field sensors. A location, size, and shape indicated for e-field sensor device 202 is merely for illustration. As described further below, a size and shape for e-field sensor device 202 may be selected based on the gesture selected to trigger operation of water dispenser 200. The location for e-field sensor device 202 may be selected based on ease of use and manufacture of water dispenser 200.

Figure 3:
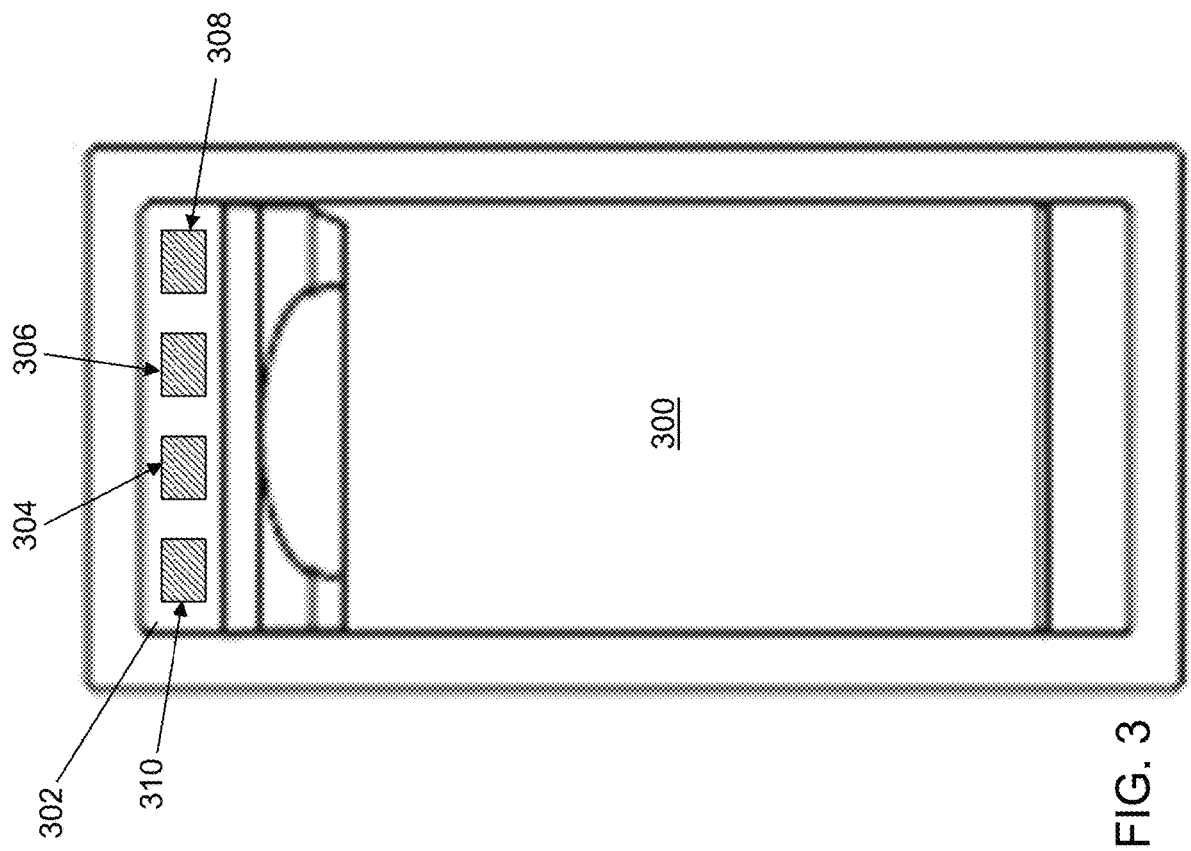
FIG. 3 depicts an ice and water dispenser with a second plurality of e-field sensor devices in accordance with an illustrative embodiment.

Referring to FIG. 3, an ice and water dispenser 300 with a second plurality of e-field sensor devices included in a dispenser interface 302 is shown in accordance with an illustrative embodiment. The second plurality of e-field sensor devices may include an ice type e-field sensor 302 designed to detect a gesture used to trigger viewing and/or changing of an ice type setting for the freezer of refrigerator 100, an ice dispense e-field sensor 304 designed to detect a first gesture used to trigger dispensing of ice and a second gesture used to trigger cessation of the dispensing of ice, a water dispense e-field sensor 306 designed to detect a third gesture used to trigger dispensing of water and a fourth gesture used to trigger cessation of the dispensing of water, and a water temperature e-field sensor 308 designed to detect a gesture used to trigger viewing and/or changing of a water temperature setting for the water dispensed from ice and water dispenser 300. Again, ice and water dispenser 300 may include a fewer or a greater number of e-field sensors. Similarly, a location, size, and shape indicated for each of the second plurality of e-field sensor devices is merely for illustration.

Figure 4:
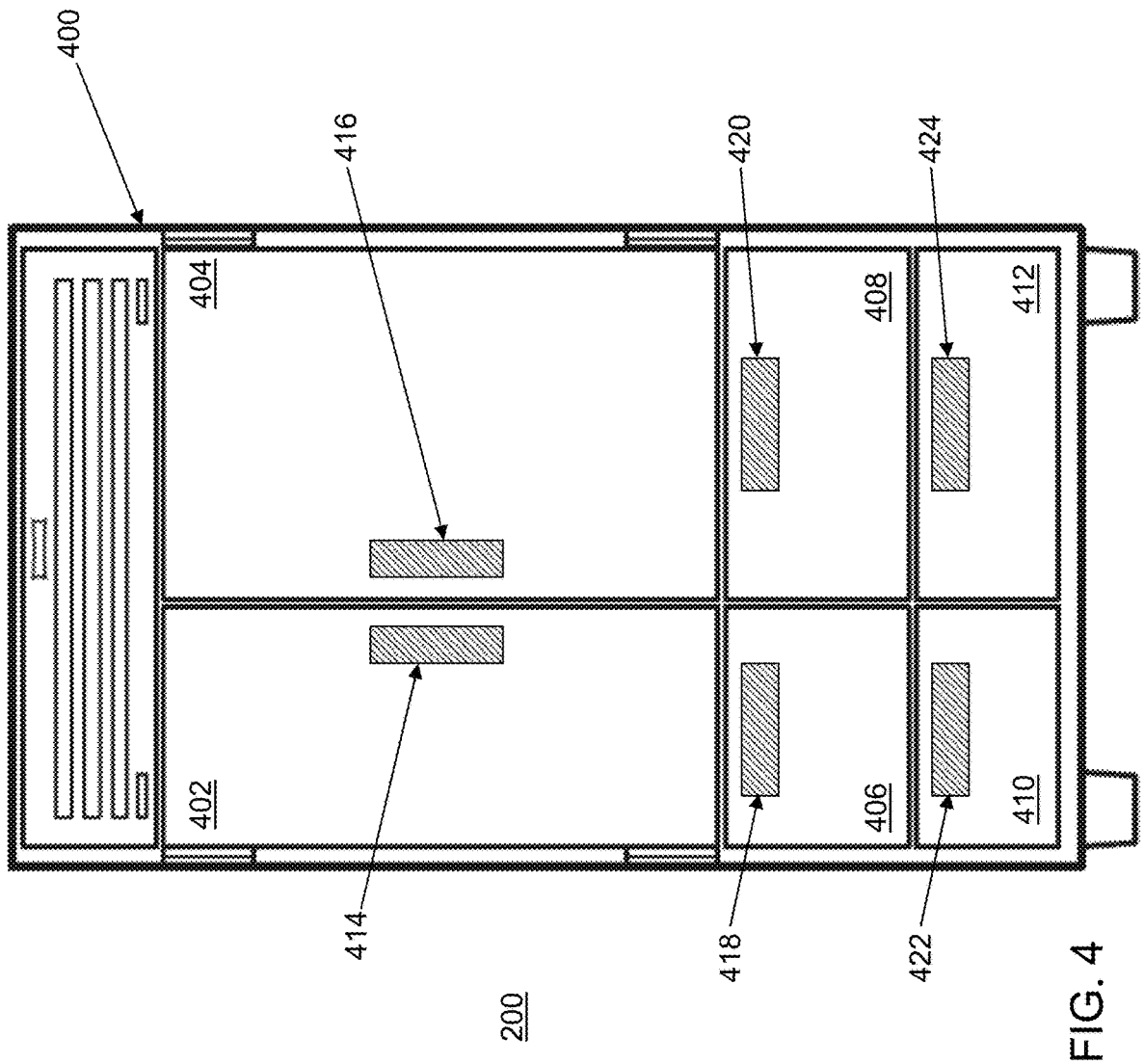
FIG. 4 depicts a second refrigerator with a third plurality of e-field sensor devices in accordance with an illustrative embodiment.

Referring to FIG. 4, a second refrigerator 400 with a third plurality of e-field sensor devices is shown in accordance with an illustrative embodiment. In the illustrative embodiment, second refrigerator 400 may include a first refrigerator door 402, a second refrigerator door 404, a first freezer drawer 406, a second freezer drawer 408, a third freezer drawer 410, and a fourth freezer drawer 412, and the third plurality of e-field sensor devices. The third plurality of e-field sensor devices may include a first refrigerator door open sensor 414, a second refrigerator door open sensor 416, a first freezer drawer open sensor 418, a second freezer drawer open sensor 420, a third freezer drawer open sensor 422, and a fourth freezer drawer open sensor 424. For example, first refrigerator door open sensor 414, second refrigerator door open sensor 416, first freezer drawer open sensor 418, second freezer drawer open sensor 420, third freezer drawer open sensor 422, and fourth freezer drawer open sensor 424 may be designed to detect an up vertical gesture to trigger opening of first refrigerator door 402, second refrigerator door 404, first freezer drawer 406, second freezer drawer 408, third freezer drawer 410, and fourth freezer drawer 412, respectively. First refrigerator door open sensor 414, second refrigerator door open sensor 416, first freezer drawer open sensor 418, second freezer drawer open sensor 420, third freezer drawer open sensor 422, and fourth freezer drawer open sensor 424 may be designed to detect a down vertical gesture to trigger closing of first refrigerator door 402, second refrigerator door 404, first freezer drawer 406, second freezer drawer 408, third freezer drawer 410, and fourth freezer drawer 412, respectively.

Again, second refrigerator 400 may include a fewer or a greater number of e-field sensors. Similarly, a location, size, and shape indicated for each of the third plurality of e-field sensor devices is merely for illustration.

Figure 5:
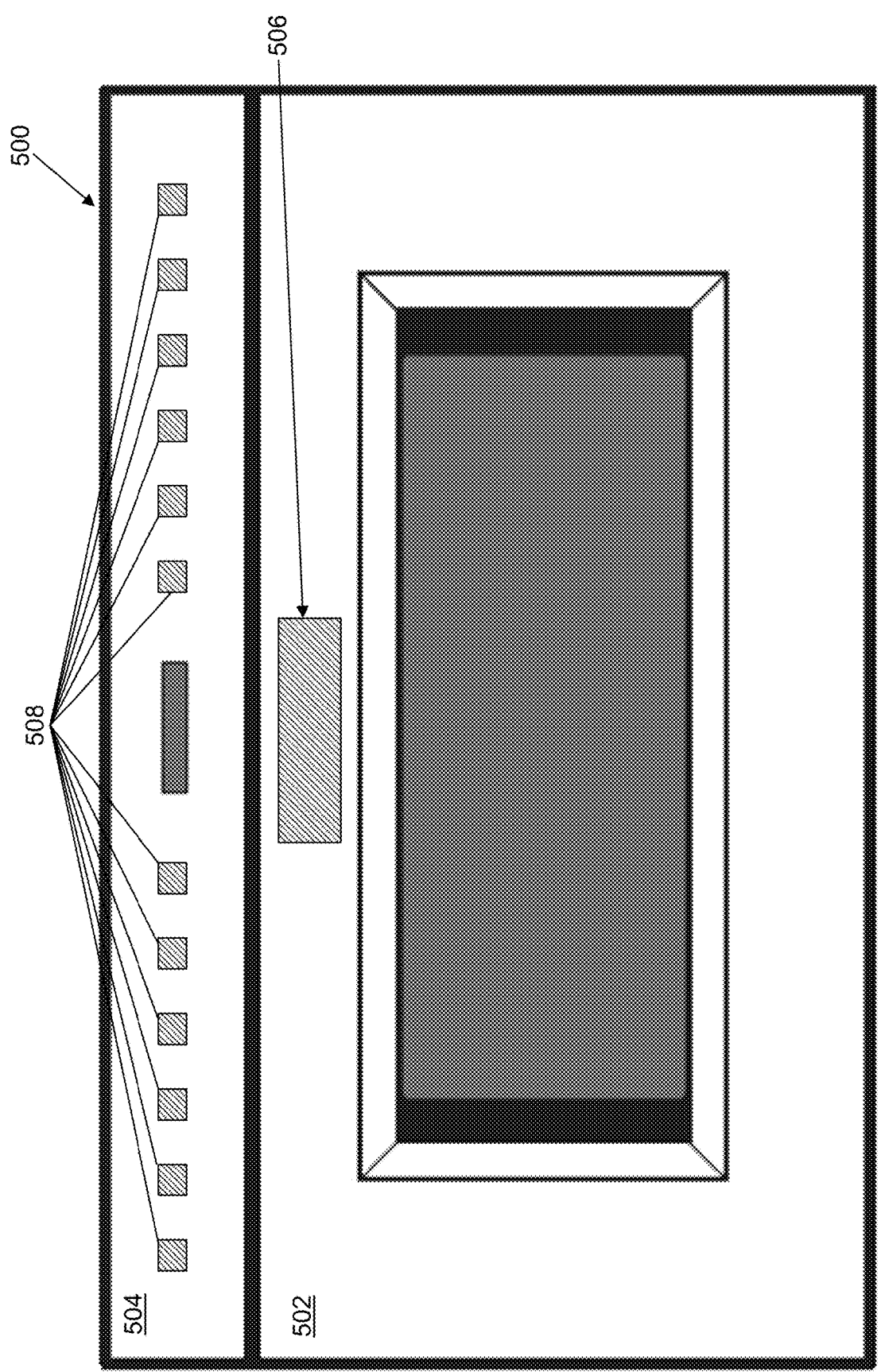
FIG. 5 depicts a built-in oven with a fourth plurality of e-field sensor devices in accordance with an illustrative embodiment.

Referring to FIG. 5, a built-in oven 500 with a fourth plurality of e-field sensor devices is shown in accordance with an illustrative embodiment. In the illustrative embodiment, built-in oven 500 may include an oven door 502 and an oven interface 504. The fourth plurality of e-field sensor devices may include an oven door open sensor 506 mounted on oven door 502. Oven door open sensor 506 may be designed to detect an up vertical gesture to trigger opening of oven door 502. Oven door open sensor 506 may be designed to detect a down vertical gesture to trigger closing of oven door 502. The fourth plurality of e-field sensor devices further may include a plurality of oven interface e-field sensors 508 that may be designed to allow the user to control an oven temperature of one or more oven burners, an oven operating mode such as steam, convection, standard, etc., an oven timer, etc. Again, built-in oven 500 may include a fewer or a greater number of e-field sensors. Similarly, a location, size, and shape indicated for each of the fourth plurality of e-field sensor devices is merely for illustration.

Figure 6:
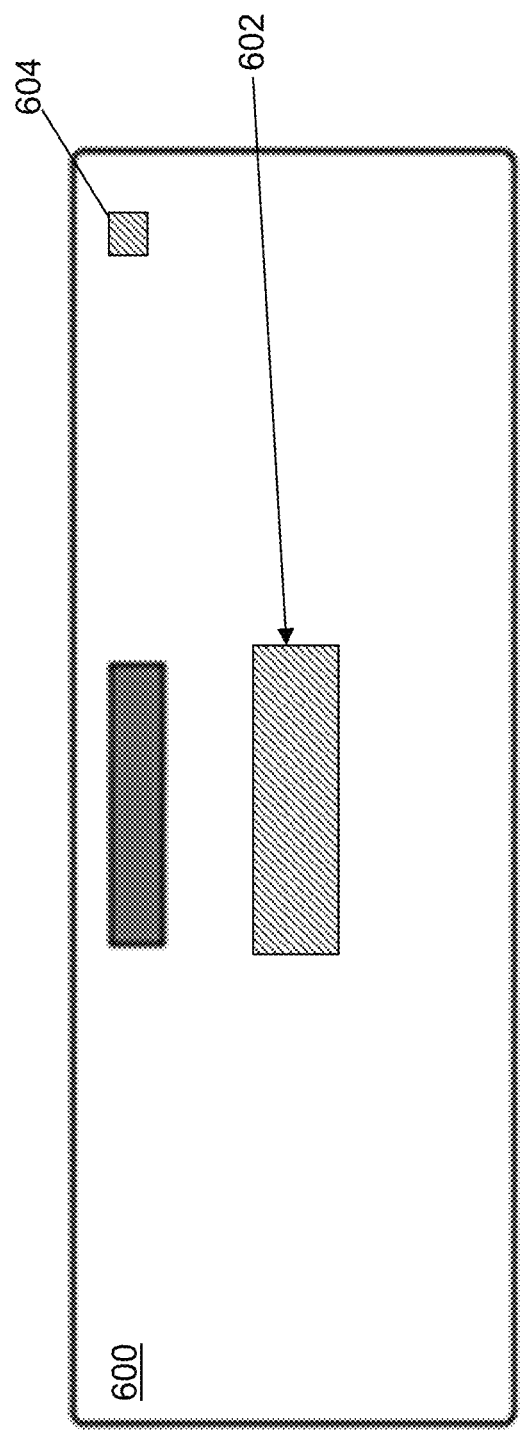
FIG. 6 depicts a warming drawer with a fifth plurality of e-field sensor devices in accordance with an illustrative embodiment.

Referring to FIG. 6, a warming drawer 600 with a fifth plurality of e-field sensor devices is shown in accordance with an illustrative embodiment. In the illustrative embodiment, the fifth plurality of e-field sensor devices may include a warming drawer open sensor 602 designed to detect an up vertical gesture to trigger opening of warming drawer 600. Warming drawer 600 open sensor 602 may be designed to detect a down vertical gesture to trigger closing of warming drawer 600. The fifth plurality of e-field sensor devices further may include a drawer temperature e-field sensor 604 that may be designed to allow the user to control a temperature of warming drawer 600. Again, warming drawer 600 may include a fewer or a greater number of e-field sensors. Similarly, a location, size, and shape indicated for each of the fifth plurality of e-field sensor devices is merely for illustration.

Figure 7:
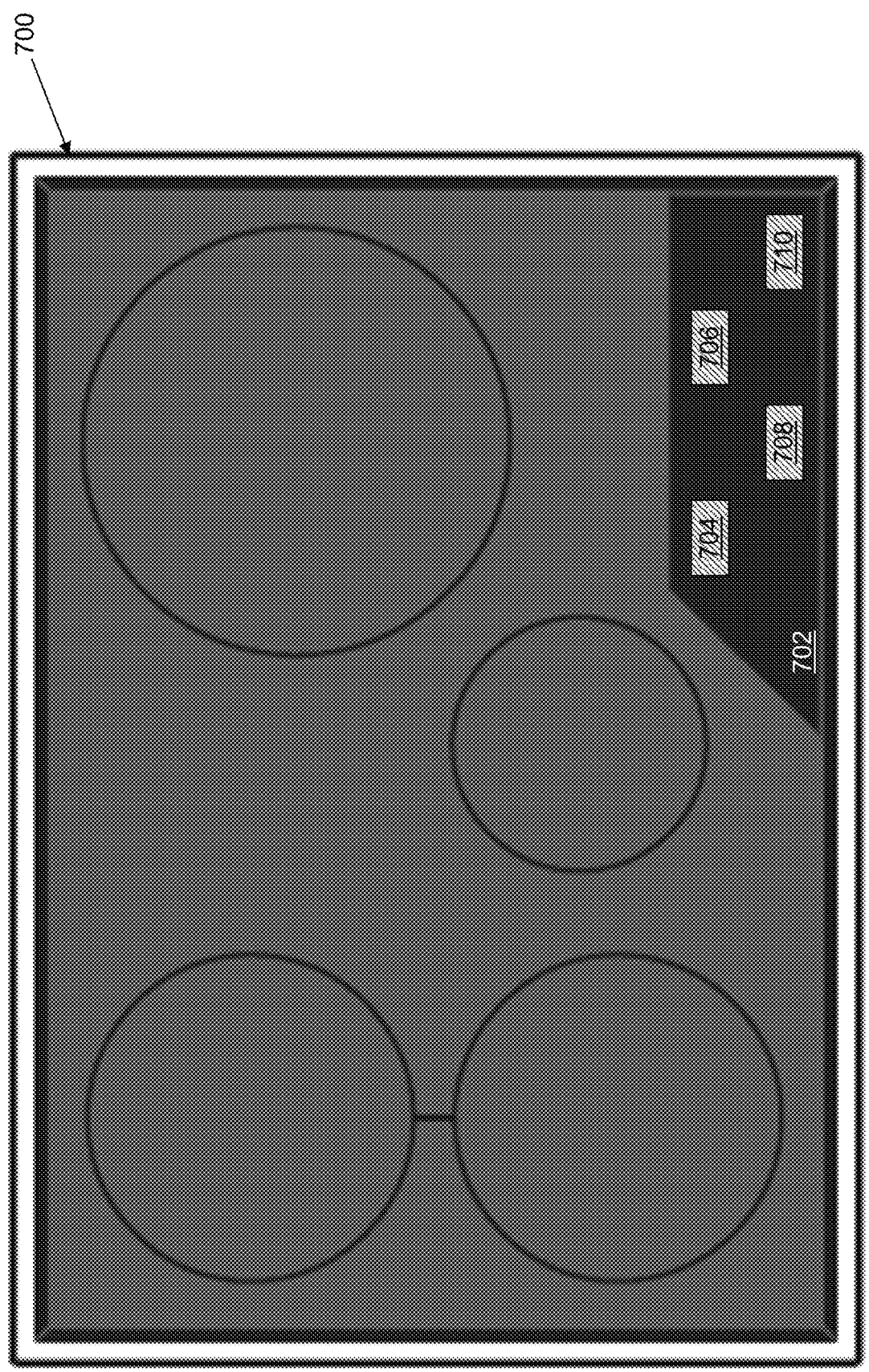
FIG. 7 depicts an induction cooktop with a sixth plurality of e-field sensor devices in accordance with an illustrative embodiment.

Referring to FIG. 7, an induction cooktop 700 with a sixth plurality of e-field sensor devices mounted to an induction cooktop user interface 702 is shown in accordance with an illustrative embodiment. In the illustrative embodiment, the sixth plurality of e-field sensor devices may include a first burner temperature e-field sensor 704, a second burner temperature e-field sensor 706, a third burner temperature e-field sensor 708, and a fourth burner temperature e-field sensor 710. Each of first burner temperature e-field sensor 704, second burner temperature e-field sensor 706, third burner temperature e-field sensor 708, and fourth burner temperature e-field sensor 710 may be designed to allow the user to control a temperature of a respective burner of induction cooktop 700. Again, induction cooktop 700 may include a fewer or a greater number of e-field sensors. Similarly, a location, size, and shape indicated for each of the sixth plurality of e-field sensor devices is merely for illustration.

Figure 8:
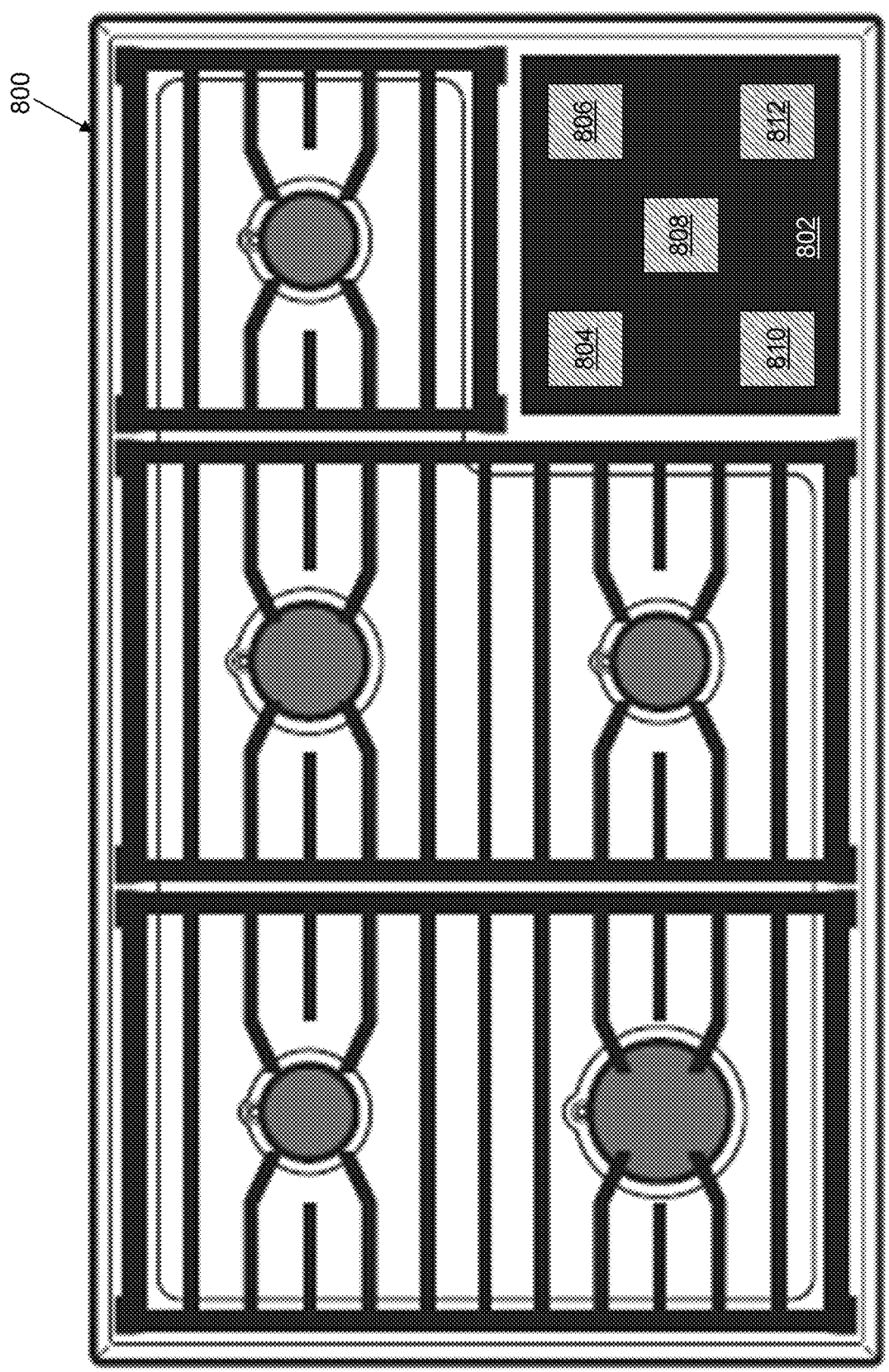
FIG. 8 depicts a gas cooktop with a seventh plurality of e-field sensor devices in accordance with an illustrative embodiment.

Referring to FIG. 8, a gas cooktop 800 with a seventh plurality of e-field sensor devices mounted to a gas cooktop user interface 802 is shown in accordance with an illustrative embodiment. In the illustrative embodiment, the seventh plurality of e-field sensor devices may include a first gas burner temperature e-field sensor 804, a second gas burner temperature e-field sensor 806, a third gas burner temperature e-field sensor 808, a fourth gas burner temperature e-field sensor 810, and a fifth gas burner temperature e-field sensor 812. Each of first gas burner temperature e-field sensor 804, second gas burner temperature e-field sensor 806, third gas burner temperature e-field sensor 808, fourth gas burner temperature e-field sensor 810, and fifth gas burner temperature e-field sensor 812 may be designed to allow the user to control a temperature of a respective burner of gas cooktop 800. Again, gas cooktop 800 may include a fewer or a greater number of e-field sensors. Similarly, a location, size, and shape indicated for each of the seventh plurality of e-field sensor devices is merely for illustration.

Figure 9:
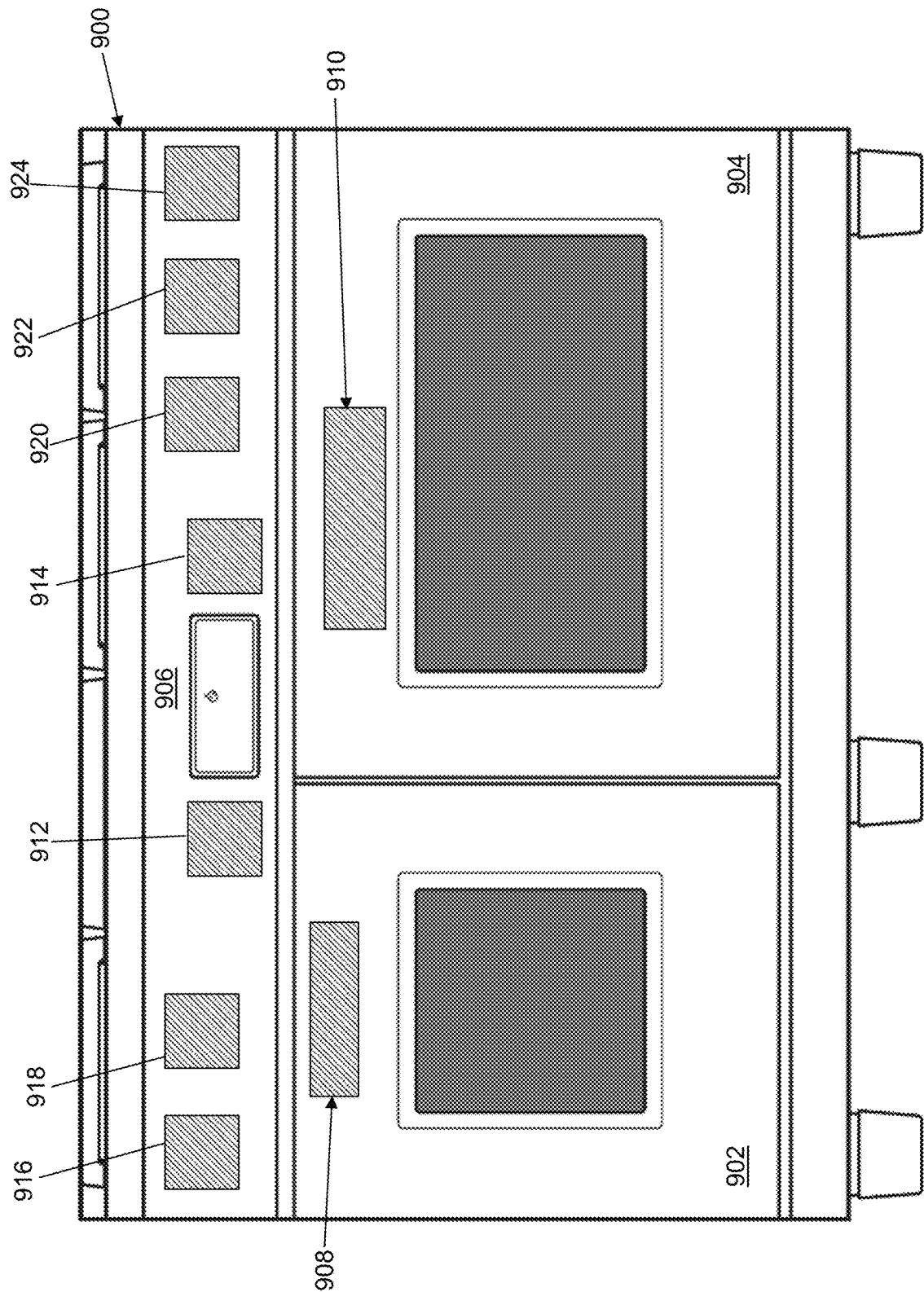
FIG. 9 depicts a range with an eighth plurality of e-field sensor devices in accordance with an illustrative embodiment.

Referring to FIG. 9, a range 900 with an eighth plurality of e-field sensor devices is shown in accordance with an illustrative embodiment. In the illustrative embodiment, range 900 may include a first oven door 902, a second oven door 904, and a range user interface 906. The eighth plurality of e-field sensor devices may include a first oven door open sensor 908 mounted on first oven door 902. First oven door open sensor 908 may be designed to detect an up vertical gesture to trigger opening of first oven door 902. First oven door open sensor 908 may be designed to detect a down vertical gesture to trigger closing of first oven door 902. The eighth plurality of e-field sensor devices further may include a second oven door open sensor 910 mounted on second oven door 904. Second oven door open sensor 910 may be designed to detect an up vertical gesture to trigger opening of second oven door 904. Second oven door open sensor 910 may be designed to detect a down vertical gesture to trigger closing of second oven door 904.

In the illustrative embodiment, the eighth plurality of e-field sensor devices further may include a first oven temperature e-field sensor 912 and a second oven temperature e-field sensor 914 mounted to range user interface 906. Each of first oven temperature e-field sensor 912 and second oven temperature e-field sensor 914 may be designed to allow the user to control a temperature of a respective oven of range 900.

In the illustrative embodiment, the eighth plurality of e-field sensor devices further may include a first gas burner temperature e-field sensor 916, a second gas burner temperature e-field sensor 918, a third gas burner temperature e-field sensor 920, a fourth gas burner temperature e-field sensor 922, and a fifth gas burner temperature e-field sensor 924 mounted to range user interface 906. Each of first gas burner temperature e-field sensor 916, second gas burner temperature e-field sensor 918, third gas burner temperature e-field sensor 920, fourth gas burner temperature e-field sensor 922, and fifth gas burner temperature e-field sensor 924 may be designed to allow the user to control a temperature of a respective burner of range 900. Again, range 900 may include a fewer or a greater number of e-field sensors. Similarly, a location, size, and shape indicated for each of the eighth plurality of e-field sensor devices is merely for illustration.

Figure 10:
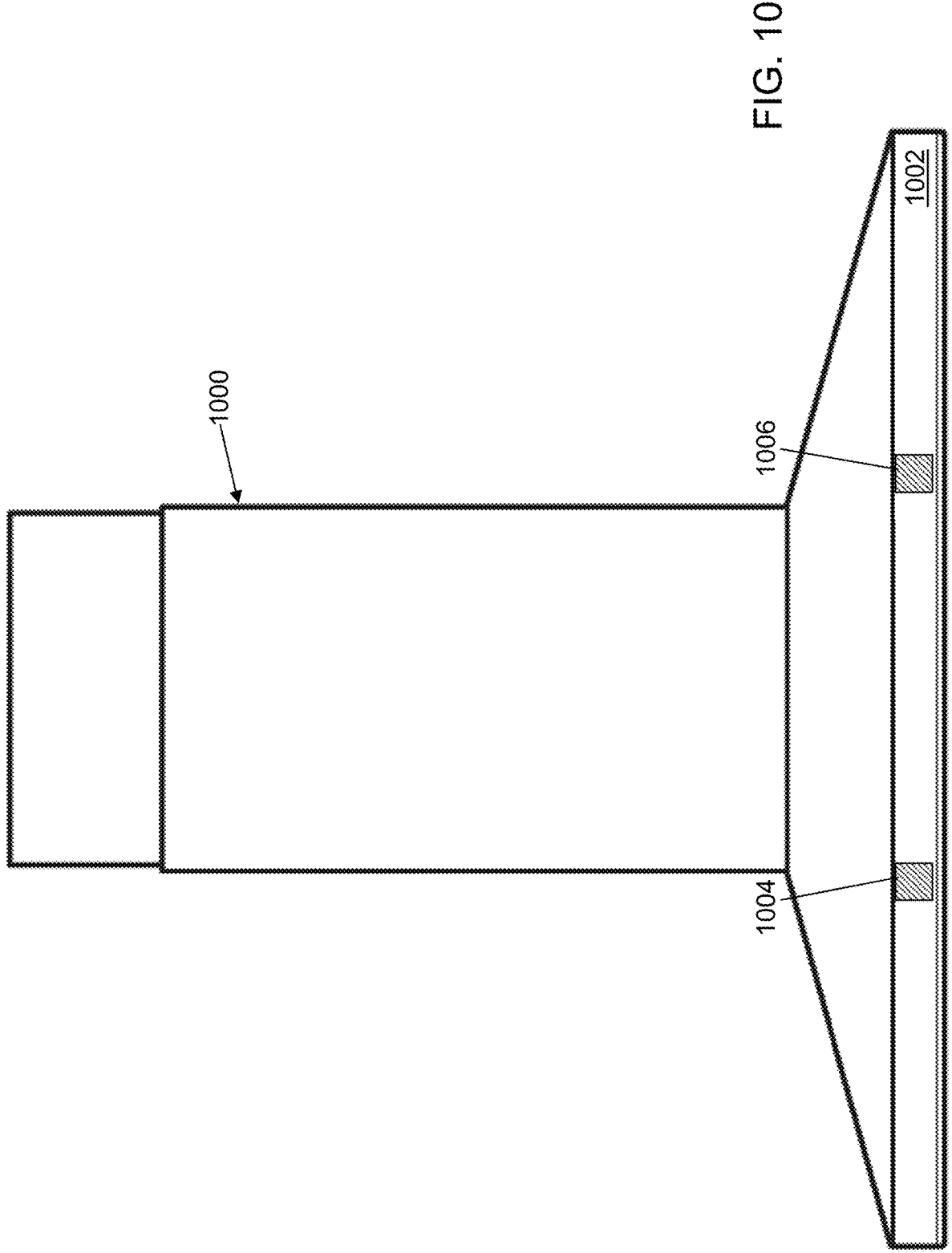
FIG. 10 depicts a ventilation hood with a ninth plurality of e-field sensor devices in accordance with an illustrative embodiment.

Referring to FIG. 10, a ventilation hood 1000 with a ninth plurality of e-field sensor devices included in a ventilation hood interface 1002 is shown in accordance with an illustrative embodiment. The ninth plurality of e-field sensor devices may include a fan speed e-field sensor 1004 designed to detect a gesture used to trigger viewing and/or changing of a fan speed of ventilation hood 1000 and a light e-field sensor 1006 designed to detect a first gesture used to trigger turning on a light of ventilation hood 1000 and to detect a second gesture used to trigger turning off the light of ventilation hood 1000. Again, ventilation hood 1000 may include a fewer or a greater number of e-field sensors. Similarly, a location, size, and shape indicated for each of the ninth plurality of e-field sensor devices is merely for illustration.

Figure 11:
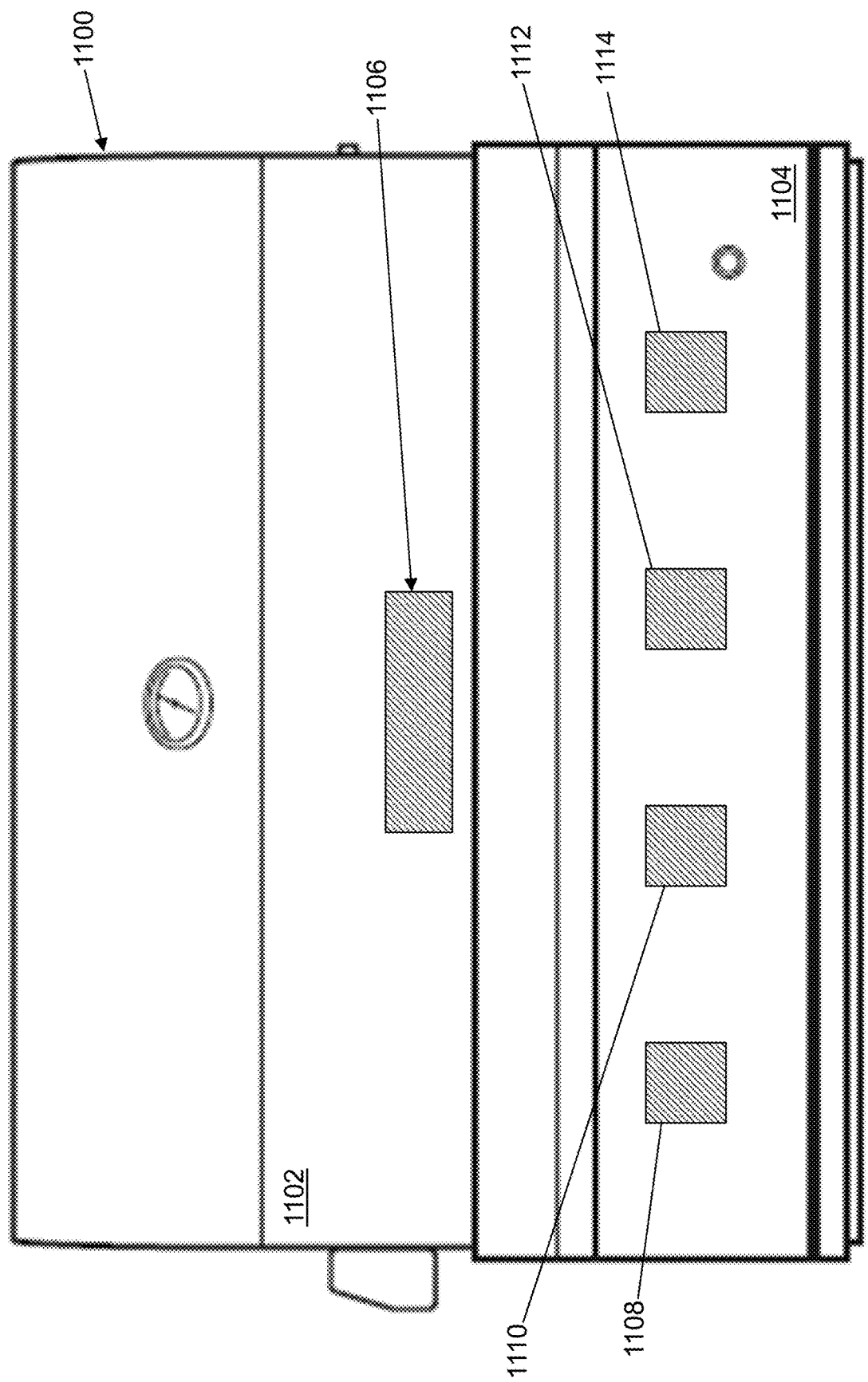
FIG. 11 depicts a grill with a tenth plurality of e-field sensor devices in accordance with an illustrative embodiment.

Referring to FIG. 11, a grill 1100 with a tenth plurality of e-field sensor devices is shown in accordance with an illustrative embodiment. In the illustrative embodiment, grill 1100 may include a grill cover 1102, a grill user interface 1104, and the tenth plurality of e-field sensor devices. The tenth plurality of e-field sensor devices may include a grill cover open sensor 1106 mounted on grill cover 1102. Grill cover open sensor 1106 may be designed to detect an up vertical gesture to trigger opening of grill cover 1102. Grill cover open sensor 1106 may be designed to detect a down vertical gesture to trigger closing of grill cover 1102.

The tenth plurality of e-field sensor devices further may include a first grill burner temperature e-field sensor 1108, a second grill burner temperature e-field sensor 1110, a third grill burner temperature e-field sensor 1112, and a fourth grill burner temperature e-field sensor 1114 mounted to grill user interface 1104. Each of first grill burner temperature e-field sensor 1108, second grill burner temperature e-field sensor 1110, third grill burner temperature e-field sensor 1112, and fourth grill burner temperature e-field sensor 1114 mounted to grill user interface 1104 may be designed to allow the user to control a temperature of a respective burner of grill 1100. Again, grill 1100 may include a fewer or a greater number of e-field sensors. Similarly, a location, size, and shape indicated for each of the tenth plurality of e-field sensor devices is merely for illustration.

Figure 12:
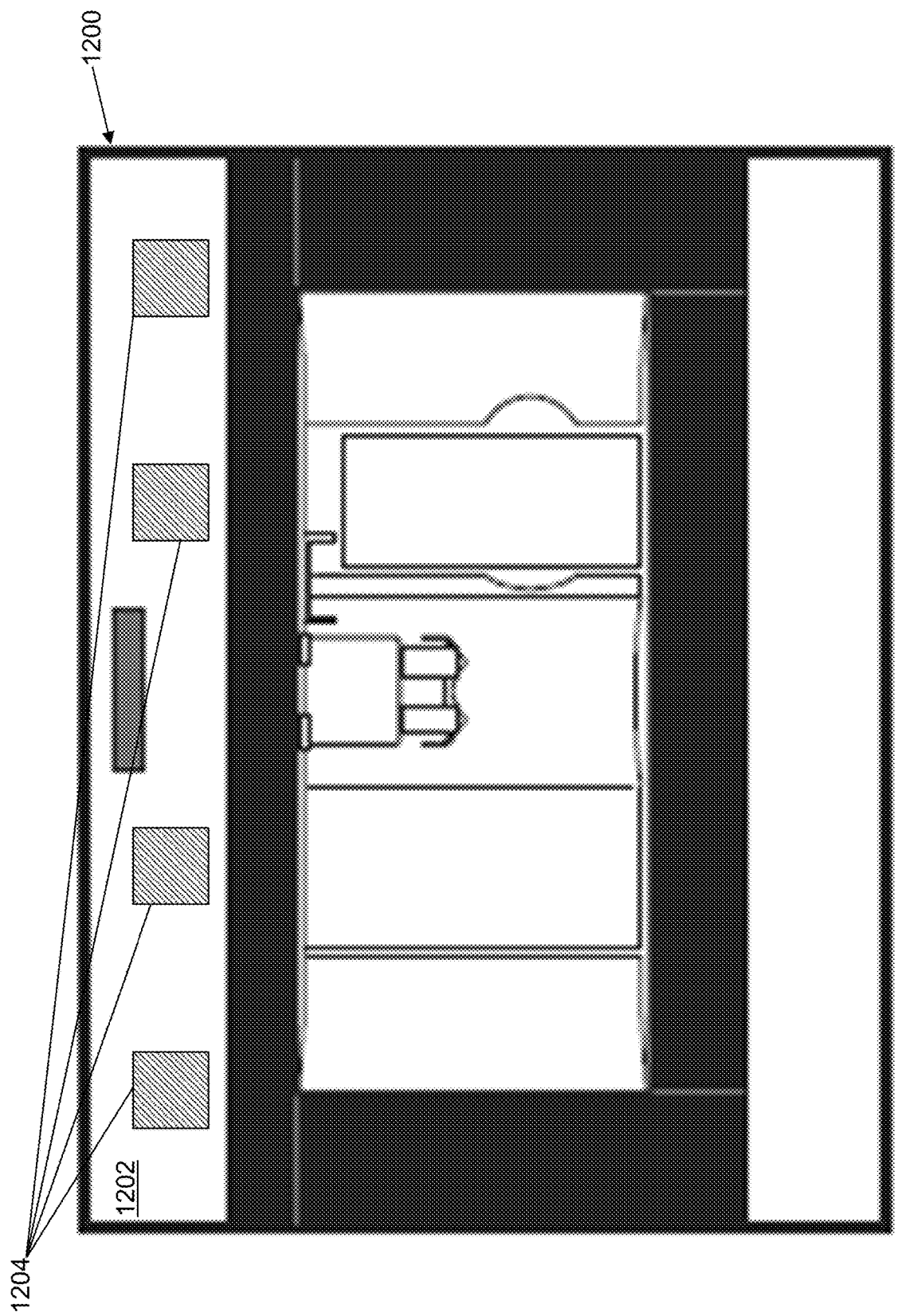
FIG. 12 depicts a coffee maker with an eleventh plurality of e-field sensor devices in accordance with an illustrative embodiment.

Referring to FIG. 12, a coffee maker 1200 with an eleventh plurality of e-field sensor devices is shown in accordance with an illustrative embodiment. In the illustrative embodiment, coffee maker 1200 may include a coffee maker interface 1202. The eleventh plurality of e-field sensor devices may include a plurality of coffee maker interface e-field sensors 1204 that may be designed to allow the user to control an operation of coffee maker 1200 such as on/off, a brew type, a coffee grind type, a serving size, etc.

Again, coffee maker 1200 may include a fewer or a greater number of e-field sensors. Similarly, a location, size, and shape indicated for each of the eleventh plurality of e-field sensor devices is merely for illustration.

Figure 13:
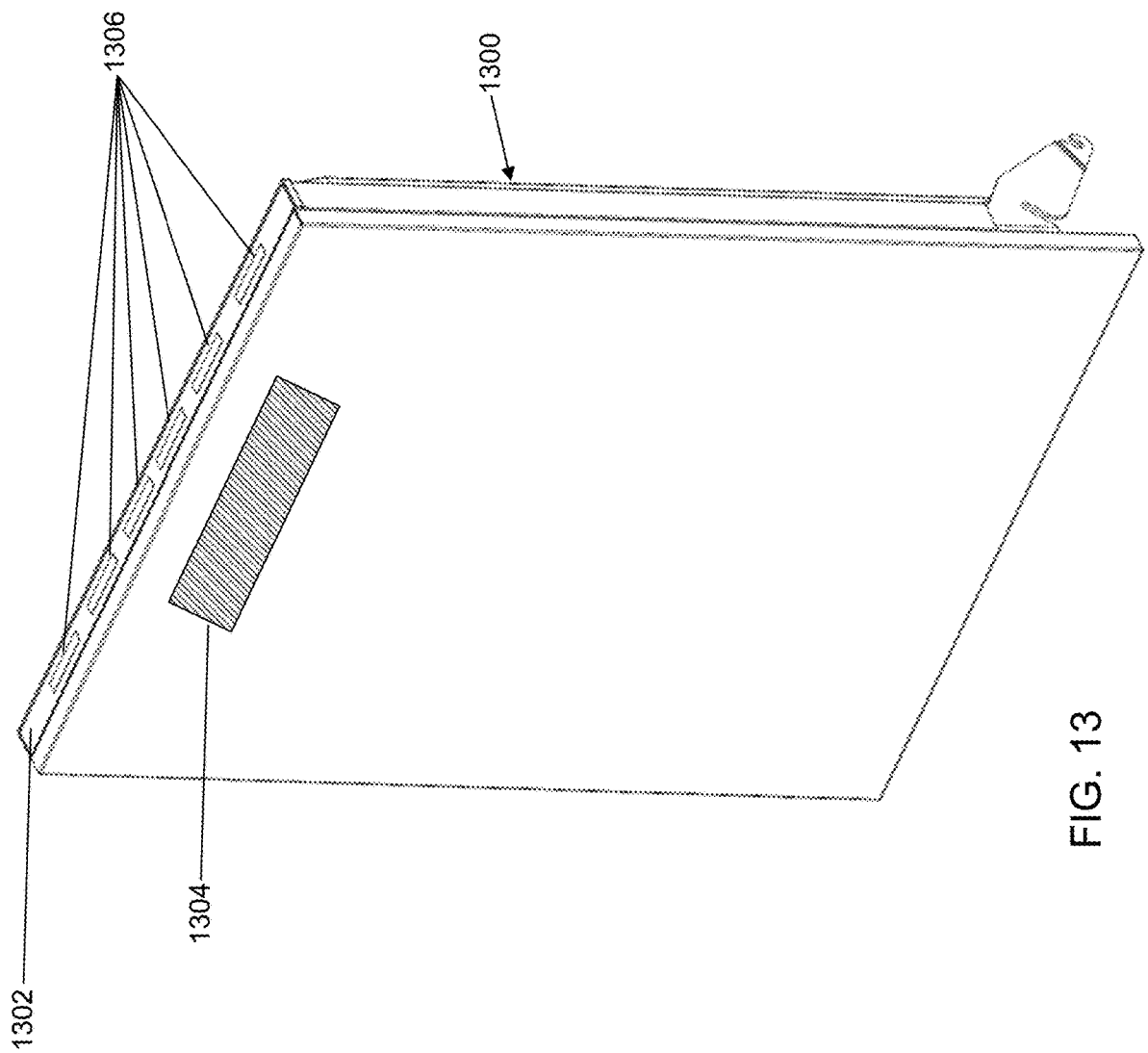
FIG. 13 depicts a dishwasher door with a twelfth plurality of e-field sensor devices in accordance with an illustrative embodiment.

Referring to FIG. 13, a dishwasher door 1300 of a dishwasher with a twelfth plurality of e-field sensor devices is shown in accordance with an illustrative embodiment. In the illustrative embodiment, dishwasher door 1300 may include a dishwasher interface 1302. The twelfth plurality of e-field sensor devices may include a dishwasher door open sensor 1304 mounted on dishwasher door 1300. Dishwasher door open sensor 1304 may be designed to detect an up vertical gesture to trigger opening of dishwasher door 1300. Dishwasher door open sensor 1304 may be designed to detect a down vertical gesture to trigger closing of dishwasher door 1300. The twelfth plurality of e-field sensor devices further may include a plurality of dishwasher interface e-field sensors 1306 that may be designed to allow the user to control an operation of the dishwasher such as indicating on/off, selecting a wash cycle, selecting a dry cycle type, etc. Again, dishwasher door 1300 may include a fewer or a greater number of e-field sensors. Similarly, a location, size, and shape indicated for each of the twelfth plurality of e-field sensor devices is merely for illustration.

Though in the illustrative embodiments of FIGS. 1 to 13 the shape of each e-field sensor was rectangular or square, each e-field sensor may independently form a variety of shapes including a circle of various sizes. In general, each e-field sensor is located where a user may expect to be able to control the appliance component. Each e-field sensor may be invisible to a user since each e-field sensor can be embedded beneath an interior or an exterior surface of the appliance. For example, each e-field sensor may be located in a user interface area or in an area where a user would expect to find a handle. Information may be provided adjacent each sensor to facilitate the user's understanding of a location and/or a gesture associated with activating each e-field sensor. Each e-field sensor may detect one or more types of gestures including approach to wake, presence, hold, air wheel (rotational movement), wave up, wave down, wave left, wave right, touch, flick up, flick down, flick left, flick right, and position tracking.

Figure 14A:
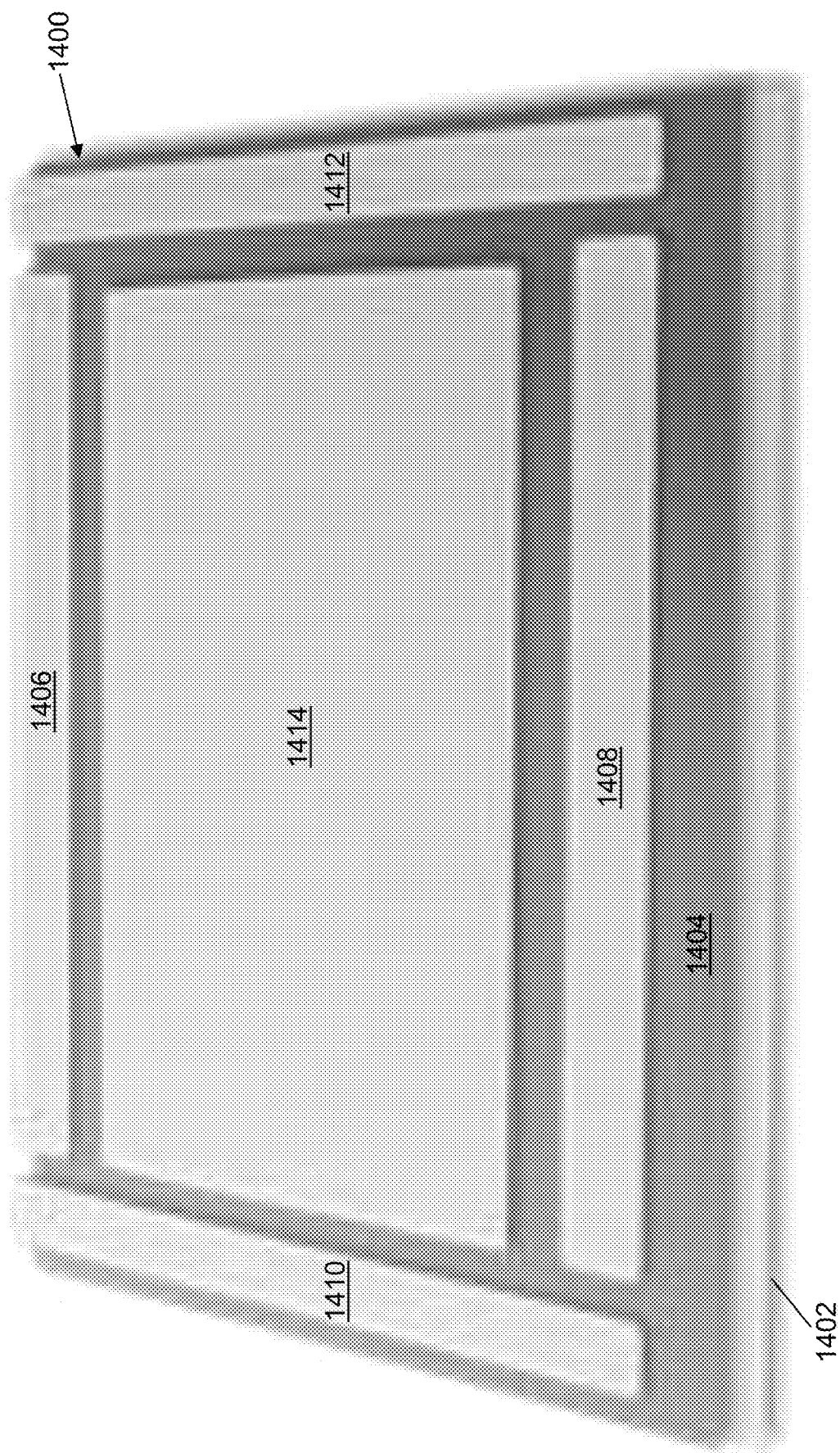
FIG. 14A depicts a perspective side view of an e-field sensor in accordance with an illustrative embodiment.
Figure 14B:
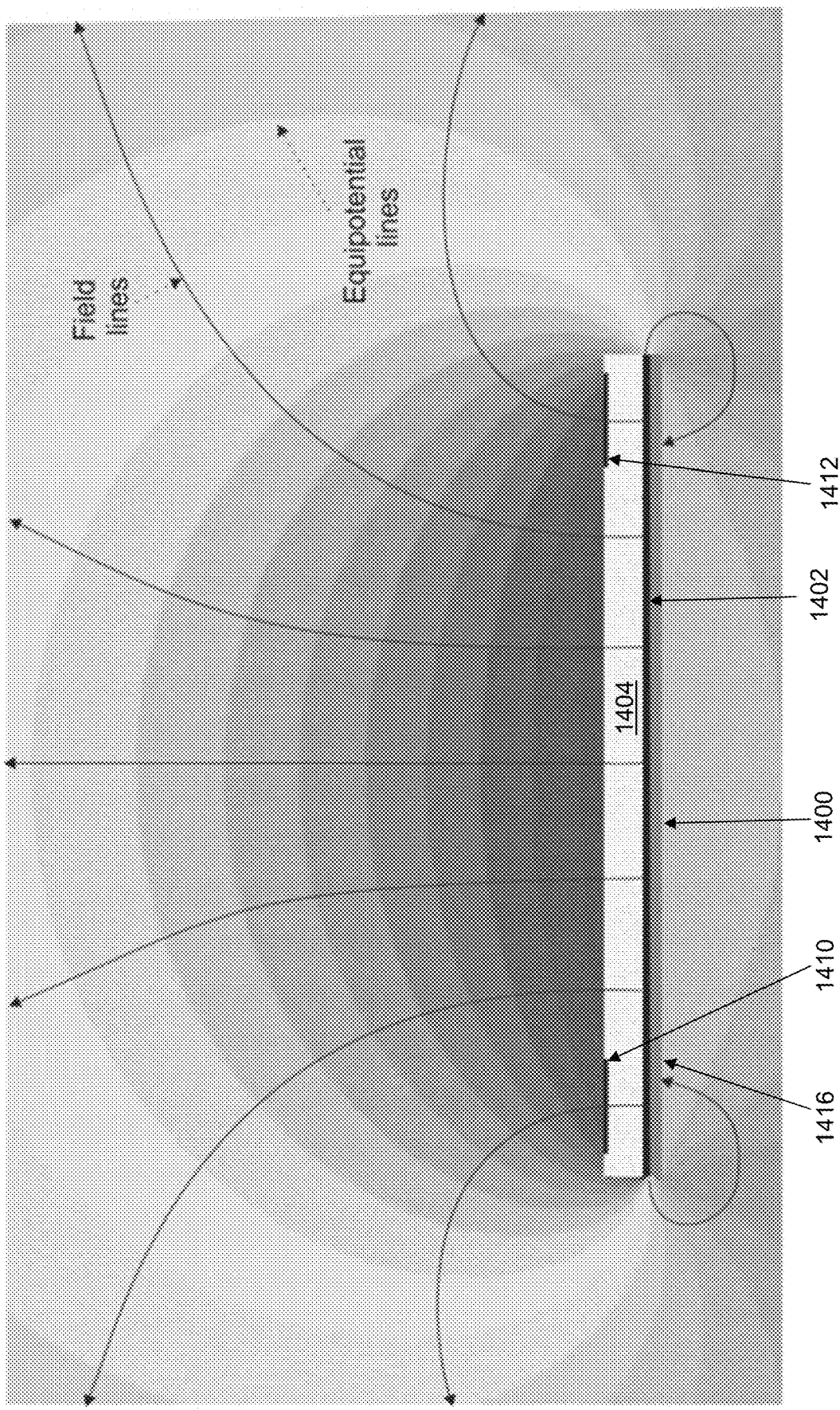
FIG. 14B depicts a side view of the e-field sensor of FIG. 14A with electric field lines in accordance with an illustrative embodiment.

Referring to FIG. 14A, a perspective side view of an e-field sensor 1400 is shown in accordance with an illustrative embodiment. Referring to FIG. 14B, a side view of e-field sensor 1400 with electric field lines is shown in accordance with an illustrative embodiment. E-field sensor 1400 may include a ground plate 1416, a transmitter electrode 1402, an isolation plate 1404, and a plurality of receive electrodes. Ground plate 1416 may be connected to a ground potential. Transmitter electrode 1402 may be formed of a conductive material such as copper, metal mesh, indium tin oxide (ITO), etc. layered on ground plate 1416 to define a width and a height of e-field sensor 1400. Isolation plate 1404 forms an isolation layer between transmitter electrode 1402 and the plurality of receive electrodes. Isolation plate 1404 may be formed of a non-conductive material such as of printed circuit board (PCB), of glass, of polyethylene terephthalate, etc. The plurality of receive electrodes are formed as a conductive layer on top of isolation plate 1404.

The plurality of receive electrodes may include from two to five electrodes arranged, sized, and shaped to detect a type of gesture. In the illustrative embodiment of FIG. 14A, e-field sensor 1400 includes a first e-field electrode 1406, a second e-field electrode 1408, a third e-field electrode 1410, a fourth e-field electrode 1412, and a fifth e-field electrode 1414. First e-field electrode 1406 is positioned above fifth e-field electrode 1414 and has a size and shape that is similar to and aligns vertically with second e-field electrode 1408. Second e-field electrode 1408 is positioned below fifth e-field electrode 1414. Third e-field electrode 1410 is positioned to the left of fifth e-field electrode 1414 and has a size and shape that is similar to and aligns horizontally with fourth e-field electrode 1412. Fourth e-field electrode 1412 is positioned to the right of fifth e-field electrode 1414. An optional non-conductive material may cover the plurality of receive electrodes to render e-field sensor 1400 invisible to a user of the appliance. For example, a material that forms the appliance user interface or door may be formed of a non-conductive material. For example, e-field sensor 1400 may be installed behind or within a wood panel on a front of refrigerator 100, built-in oven 500, dishwasher door 1300, etc.

First e-field electrode 1406 is parallel to and aligned with second e-field electrode 1408. Third e-field electrode 1410 is parallel to and aligned with fourth e-field electrode 1412. Fifth e-field electrode 1414 is bordered by first e-field electrode 1406, second e-field electrode 1408, third e-field electrode 1410, and fourth e-field electrode 1412. First e-field electrode 1406 also forms a mirror image of second e-field electrode 1408, where a mirror image is a reflected duplication of second e-field electrode 1408 that appears identical, but reversed in a direction perpendicular to a mirror surface positioned between first e-field electrode 1406 and second e-field electrode 1408 and parallel to first e-field electrode 1406 and second e-field electrode 1408. Third e-field electrode 1410 also forms a mirror image of fourth e-field electrode 1412.

Figure 18:
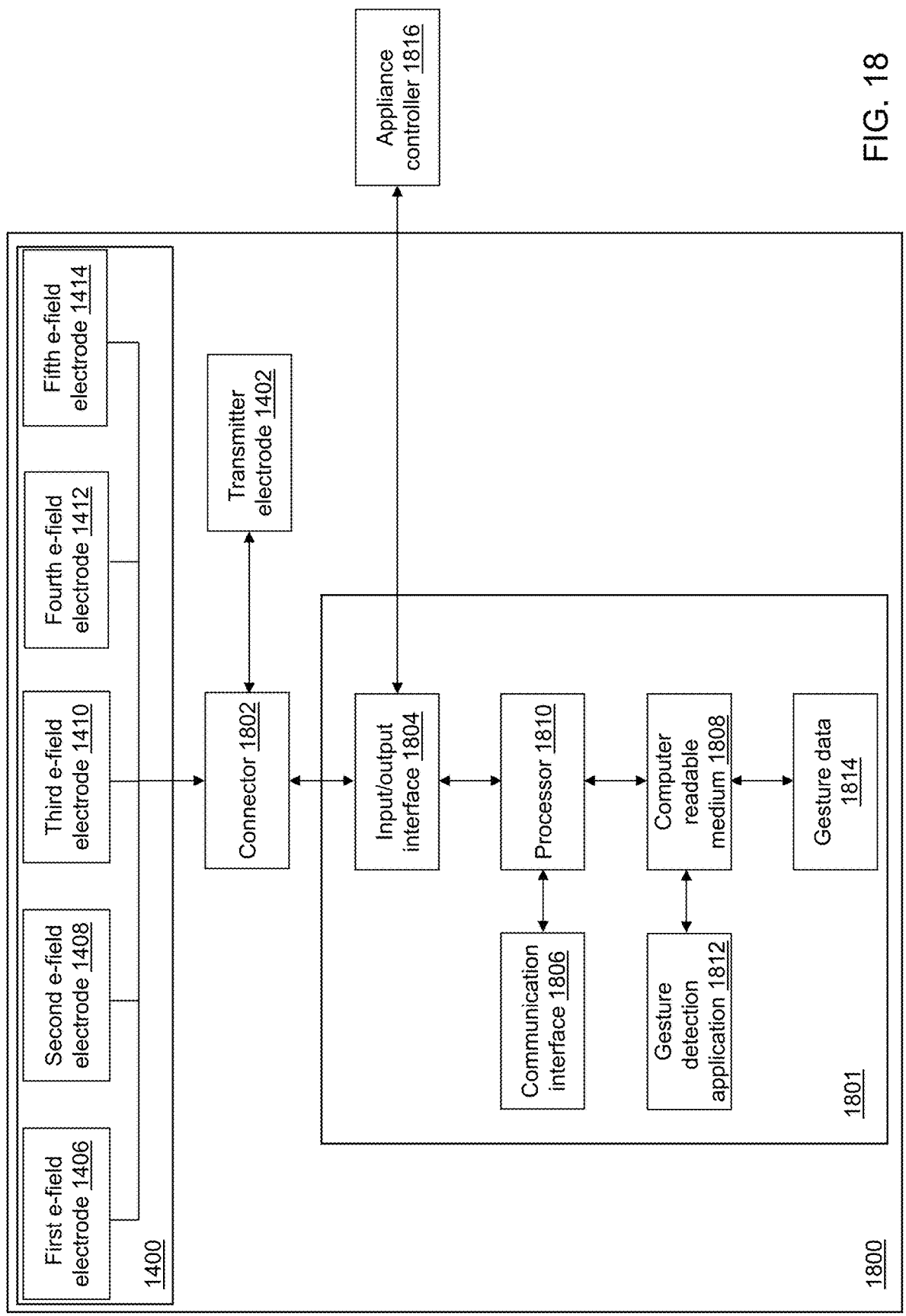
FIG. 18 depicts a block diagram of an e-field sensor device in accordance with an illustrative embodiment.

Transmitter electrode 1402 may be connected to an e-field controller 1801 (shown referring to FIG. 18) by a transmit connector of connector 1802 (shown referring to FIG. 18). E-field controller 1801 may control a voltage signal provided to transmitter electrode 1402 to generate an electric field surrounding e-field sensor 1400, for example, as shown referring to FIG. 14B. The plurality of receive electrodes may be connected to e-field controller 1801 by respective receive connectors of connector 1802. The plurality of receive electrodes receive the electric field generated by transmitter electrode 1402 and generate a corresponding voltage signal based on the electric field to which each respective electrode is exposed. When a finger, hand, knee, foot, etc. of the user is positioned within a predefined distance from e-field sensor 1400, the electric field is modified based on a location of the finger, hand, knee, foot, etc. relative to each receive electrode. A presence of the finger, hand, knee, foot, etc. may not be detected unless the finger, hand, knee, foot, etc. is positioned within a predefined distance from e-field sensor 1400.

Once the user enters the sensing area defined by the predefined distance outward from e-field sensor 1400, the electrical field distribution becomes distorted. For example, the field lines intercepted by the hand are shunted to ground through the conductivity of the human body itself. The proximity of the hand causes a compression of the equipotential lines and shifts the receive electrode signal levels to a lower potential that is detected by e-field controller 1801.

Figure 16:
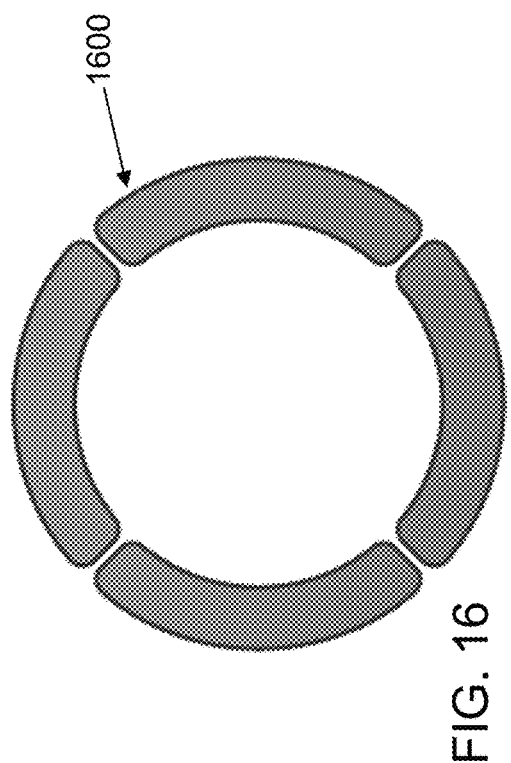
FIG. 16 depicts a top view of receive electrodes of an e-field sensor in accordance with a third illustrative embodiment.
Figure 15:
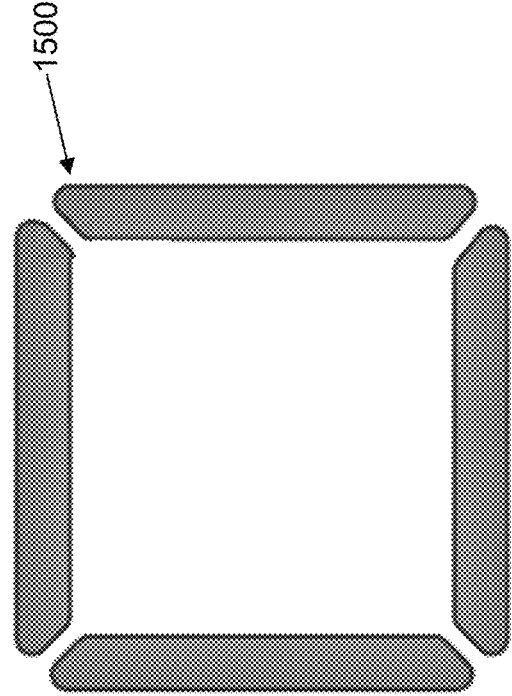
FIG. 15 depicts a top view of receive electrodes of an e-field sensor in accordance with a second illustrative embodiment.
Figure 17:
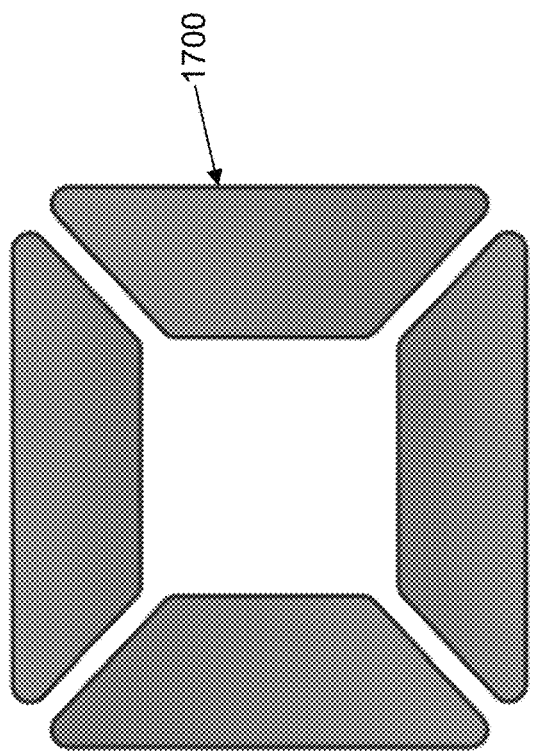
FIG. 17 depicts a top view of receive electrodes of an e-field sensor in accordance with a fourth illustrative embodiment.

Referring to FIG. 15, a top view of first receive electrodes 1500 of a second e-field sensor are shown in accordance with a second illustrative embodiment. Referring to FIG. 16, a top view of second receive electrodes 1600 of a third e-field sensor are shown in accordance with a third illustrative embodiment. Referring to FIG. 17, a top view of third receive electrodes 1700 of a fourth e-field sensor are shown in accordance with a third illustrative embodiment. First receive electrodes 1500, second receive electrodes 1600, and third receive electrodes 1700 show additional illustrative shapes and orientations for the receive electrodes where a center electrode may be included in a center of each arrangement of four electrodes. Similar to first e-field electrode 1406, second e-field electrode 1408, third e-field electrode 1410, fourth e-field electrode 1412 of e-field sensor 1400, corresponding electrodes of first receive electrodes 1500, second receive electrodes 1600, and third receive electrodes 1700 form paired vertical and horizontal mirror images.

A size of transmitter electrode 1402 and the plurality of receive electrodes may determine how the user interacts with the appliance. A wave motion is detected using a time of sensing between two parallel receive electrodes such as first e-field electrode 1406 and second e-field electrode 1408 or third e-field electrode 1410 and fourth e-field electrode 1412. For example, if only a wave from left to right and/or a wave from right to left are detected by e-field sensor 1400, e-field sensor 1400 may only include first e-field electrode 1406 and second e-field electrode 1408. A physical spacing of the receive electrodes and gesture data 1814 (shown referring to FIG. 18) can be designed/selected to define a specific motion requirement. For example, a minimum time or a maximum time of waving across two receive electrodes. A physical size of transmitter electrode 1402 and the plurality of receive electrodes can be selected to define a target area for action to occur, how large of a motion is required, or a detection area to determine that a user is presently interacting with e-field sensor 1400. For example, fifth e-field electrode 1414 may be used to determine when a user is present based on a change in voltage received from fifth e-field electrode 1414.

Referring to FIG. 18, a block diagram of an e-field sensor device 1800 is shown in accordance with an illustrative embodiment. E-field sensor device 1800 is an example of each of the first, second, third, fourth, fifth, sixth, seventh, eighth, ninth, tenth, eleventh, and twelfth plurality of e-field sensor devices. E-field sensor device 1800 may include first e-field electrode 1406, second e-field electrode 1408, third e-field electrode 1410, fourth e-field electrode 1412, fifth e-field electrode 1414, transmitter electrode 1402, e-field controller 1801, and connector 1802. First e-field electrode 1406, second e-field electrode 1408, third e-field electrode 1410, fourth e-field electrode 1412, fifth e-field electrode 1414, and transmitter electrode 1402 connect to e-field controller 1801 through connector 1802 that may include a distinct wire, pin, etc. connected between each electrode and e-field controller 1801. For example, e-field sensor device 1800 may be formed on a single PCB in an illustrative embodiment. E-field controller 1801 may be connected to first e-field electrode 1406, second e-field electrode 1408, third e-field electrode 1410, fourth e-field electrode 1412, fifth e-field electrode 1414, and transmitter electrode 1402, for example, using connector 1802 that is a wire, a wireless connection, a soldered connection, etc. An appliance controller 1816 may be connected to e-field sensor device 1800, for example, using a wire, wireless connection, soldered connection, etc. or e-field sensor device 1800 may be integrated on a common PCB with appliance controller 1816.

E-field controller 1801 may include an input/output interface 1804, a communication interface 1806, a non-transitory computer-readable medium 1808, a processor 1810, a gesture detection application 1812, and gesture data 1814. Fewer, different, and/or additional components may be incorporated into e-field controller 1801.

Input/output (I/O) interface 1804 provides an interface for receiving information from the user or another device, such as first e-field electrode 1406, second e-field electrode 1408, third e-field electrode 1410, fourth e-field electrode 1412, fifth e-field electrode 1414, and transmitter electrode 1402 through connector 1802, for entry into e-field controller 1801 and/or for outputting information for review by the user and/or for use by another device, such as appliance controller 1816, as understood by those skilled in the art. Input/output interface 1804 may interface with various input technologies including, but not limited to, a keyboard, a microphone, a mouse, a display, a track ball, a keypad, one or more buttons, a speaker, a printer, etc. to allow the user to enter information into e-field controller 1801 or to make selections presented in a user interface displayed on the display. E-field controller 1801 may have one or more I/O interfaces that use the same or a different I/O interface technology. The I/O interface technology further may be accessible by e-field controller 1801 through communication interface 1806.

Communication interface 1806 provides an interface for receiving and transmitting data between devices using various protocols, transmission technologies, and media as understood by those skilled in the art. Communication interface 1806 may support communication using various transmission media that may be wired and/or wireless. E-field controller 1801 may have one or more communication interfaces that use the same or a different communication interface technology. For example, e-field controller 1801 may support communication using an Ethernet port, a Bluetooth antenna, a telephone jack, a USB port, etc. Data and/or messages may be transferred between e-field controller 1801 and another device such as appliance controller 1816 using communication interface 1806.

Computer-readable medium 1808 is an electronic holding place or storage for information so the information can be accessed by processor 1810 as understood by those skilled in the art. Computer-readable medium 1808 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. E-field controller 1801 may have one or more computer-readable media that use the same or a different memory media technology. For example, computer-readable medium 1808 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. E-field controller 1801 also may have one or more drives that support the loading of a memory media such as a CD, DVD, an external hard drive, etc. One or more external hard drives further may be connected to e-field controller 1801 using communication interface 1806.

Processor 1810 executes instructions as understood by those skilled in the art. The instructions may be carried out by a special purpose computer, logic circuits, or hardware circuits. Processor 1810 may be implemented in hardware and/or firmware. Processor 1810 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 1810 operably couples with I/O interface 1804, with communication interface 1806, and with computer-readable medium 1808 to receive, to send, and to process information. Processor 1810 may retrieve a set of instructions from a permanent memory device and copy the instructions in an executable form to a temporary memory device that is generally some form of RAM. E-field controller 1801 may include a plurality of processors that use the same or a different processing technology.

Gesture detection application 1812 performs operations associated with detecting a gesture by a user effecting the electric field generated by transmitter electrode 1402 that is received by first e-field electrode 1406, second e-field electrode 1408, third e-field electrode 1410, fourth e-field electrode 1412, and/or fifth e-field electrode 1414 and sent to and received by e-field controller 1801 through connector 1802. Some or all of the operations described herein may be embodied in gesture detection application 1812. The operations may be implemented using hardware, firmware, software, or any combination of these methods.

Referring to the example embodiment of FIG. 18, gesture detection application 1812 is implemented in software (comprised of computer-readable and/or computer-executable instructions) stored in computer-readable medium 1808 and accessible by processor 1810 for execution of the instructions that embody the operations of gesture detection application 1812. Gesture detection application 1812 may be written using one or more programming languages, assembly languages, scripting languages, etc.

Gesture data 1814 may include any data used by gesture detection application 1812 to detect the gesture by the user. For example, data describing the location, size, and shape of first e-field electrode 1406, second e-field electrode 1408, third e-field electrode 1410, fourth e-field electrode 1412, fifth e-field electrode 1414, and transmitter electrode 1402 may be stored in gesture data 1814.

For illustration, e-field controller 1801 may use the Gesture IC technology provided by Microchip Technology Inc. of Chandler, Ariz., USA in the form of the MGC3030, MGC3130, and/or MGC3140 near-field e-field three-dimensional (3D) gesture controllers. The illustrative controllers enable user gesture detection and motion tracking on a single-chip with no host processing needed for embedded applications. The e-field sensor integrated with the MGC3030, MGC3130, and/or MGC3140 controller are capable of detecting direct motion and gestures from a user at a distance through the surface material of the appliance. The e-field sensor design is adapted using the Gesture IC technology in a form factor that fits the end use and allows for a seamless integration. The Gesture IC technology supports the programming for specific sequences of gestures.

The Gesture IC technology uses transmit frequencies in the range of 100 kHz, which provides a wavelength of about three kilometers. Given the much smaller receive electrode geometries, the transmit wavelength is much larger in comparison resulting in a magnetic component that is approximately zero with no wave propagation taking place. The result is a quasi-static electrical near field that can be used for sensing conductive objects such as the human body.

Figure 19:
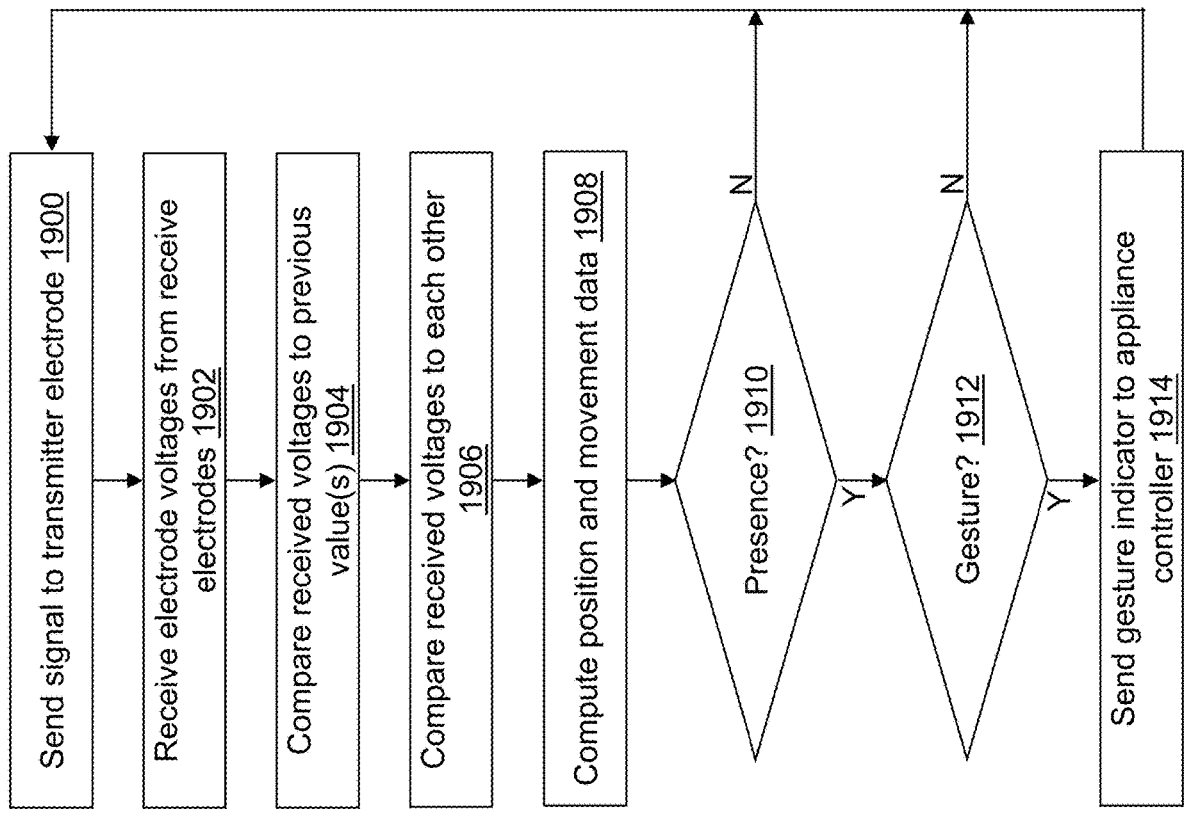
FIG. 19 depicts a flow diagram illustrating examples of operations performed by the e-field sensor device of FIG. 18 in accordance with an illustrative embodiment.

Referring to FIG. 19, example operations associated with gesture detection application 1812 are described. Additional, fewer, or different operations may be performed depending on the embodiment of gesture detection application 1812. The order of presentation of the operations of FIG. 19 is not intended to be limiting. Some of the operations may not be performed in some embodiments. Although some of the operational flows are presented in sequence, the various operations may be performed in various repetitions and/or in other orders than those that are illustrated. For example, once the presence of the user is detected, a different processing loop may be entered to track the user's body part and determine whether a gesture has been performed until the presence is no longer detected. Additionally, though not shown, e-field controller 1801 may periodically go to sleep and then wake to scan for the user's presence to reduce power usage by e-field sensor device 1800. As another example, e-field controller 1801 may go to sleep and wake when the user touches one of the receive electrodes of the e-field sensor.

In an operation 1900, a transmit signal such as a voltage signal with a predefined carrier frequency is sent to transmitter electrode 1402. In response to receipt of the transmit signal, transmitter electrode 1402 radiates an electric field surrounding the associated e-field sensor such as e-field sensor 1400, for example, as shown in FIG. 14B.

In an operation 1902, electrode voltage signals are received by each receive electrode of the associated e-field sensor such as first e-field electrode 1406, second e-field electrode 1408, third e-field electrode 1410, fourth e-field electrode 1412, and fifth e-field electrode 1414 of e-field sensor 1400.

In an operation 1904, the received electrode voltages are compared to previous values to determine when the electric field is disturbed. When there is no approach by the user, the comparison signals are approximately zero. Any combination of receive electrodes can be enabled to support presence detection.

In operation 1906, the received electrode voltages are compared to each other to further determine how the electric field has been disturbed.

In an operation 1908, 3D position and movement data of the user's body part that is adjacent the associated e-field sensor are computed based on the comparison in operation 1906. For example, the Gesture IC technology provided by Microchip Technology Inc. of Chandler, Ariz., USA supports a detection method that recognizes an electrical center of mass of a human hand and that can track a single point inside the sensing space of the receive electrodes over time.

In an operation 1910, a determination is made concerning whether the user is adjacent the associated e-field sensor based on the comparisons in operation 1904 and/or 1906 and/or the computations in operation 1908. When the user is adjacent the associated e-field sensor, processing continues in an operation 1912. When the user is not adjacent the associated e-field sensor, processing continues in operation 1900 to either go to sleep or send another transmit signal.

In an operation 1912, a determination is made concerning whether the position and movement data indicates a predefined gesture to be detected by the associated e-field sensor. When the position and movement data indicate a predefined gesture to be detected, processing continues in an operation 1914. When the position and movement data do not indicate a predefined gesture to be detected, processing continues in operation 1900 to either go to sleep or send another transmit signal.

In operation 1914, a signal is sent to appliance controller 1816 indicating occurrence of the gesture that was detected in operation 1912, and processing continues in operation 1900 to either go to sleep or send another transmit signal.

Gestures can have various sizes and can be performed at various speeds. A gesture may be a hand or other body part held adjacent the sensing area. For example, a hand held in front of the sensing area of e-field sensor device 202 with little or no movement may indicate that water dispenser 200 dispense water as discussed previously.

Gesture recognition may not be triggered when the movement of a gesture is very slow or fast. A flick gesture is defined as a linear hand or finger movement in a specified direction. A double flick gesture is defined as a linear movement of two fingers in a specified direction. Edge flicks are performed at the edge of the sensing area by starting outside the sensing area and covering less than 70% of the sensing area. Flick gestures can start and end inside and outside the sensing area defined by the receive electrodes and be defined in up to four directions (up to down, down to up, left to right, right to left) when first e-field electrode 1406, second e-field electrode 1408, third e-field electrode 1410, and fourth e-field electrode 1412 are included in the e-field sensor such as e-field sensor 1400.

A circle gesture is defined as a hand or finger movement performing a full circle either clockwise or counter clockwise inside the sensing area. To be classified as a gesture, the user's body part may stop moving briefly after one complete revolution or exit the sensing area. Constant circular gestures without interruption may be recognized as an air wheel gesture.

Figure 20:
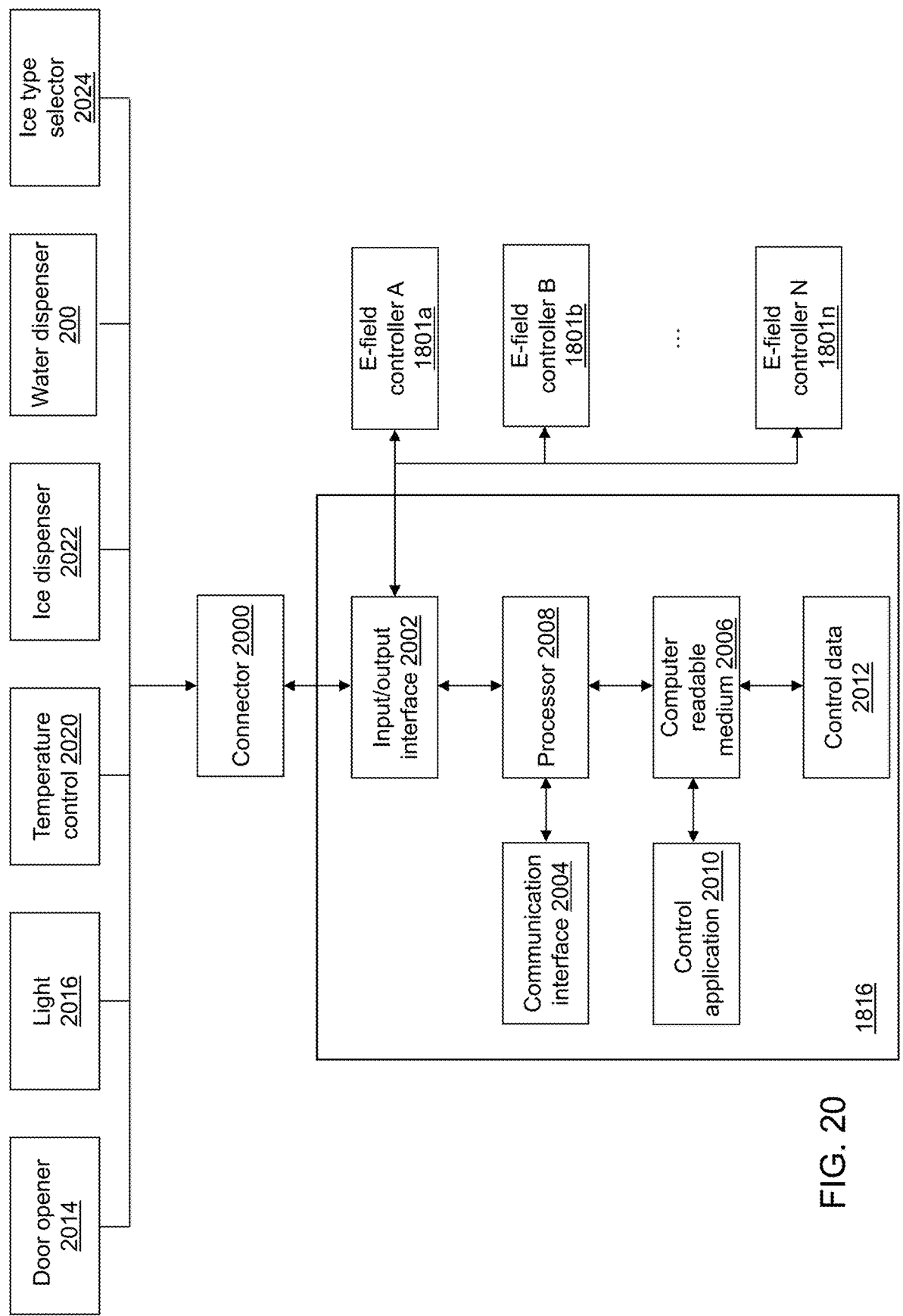
FIG. 20 depicts a block diagram of an appliance controller of an appliance control system in accordance with an illustrative embodiment.

Referring to FIG. 20, a block diagram of appliance controller 1816 is shown in accordance with an illustrative embodiment. Appliance controller 1816 may include a second I/O interface 2002, a second communication interface 2004, a second non-transitory computer-readable medium 2006, a second processor 2008, a control application 2010, and control data 2012. Fewer, different, and/or additional components may be incorporated into appliance controller 1816. Control data 2012 may include any data associated with control of the associated appliance.

Second I/O interface 2002 provides the same or similar functionality as that described with reference to I/O interface 1804 of e-field controller 1801 though referring to appliance controller 1816. Second communication interface 2004 provides the same or similar functionality as that described with reference to communication interface 1806 of e-field controller 1801 though referring to appliance controller 1816. Data and messages may be transferred between e-field controller 1801 and appliance controller 1816 using second communication interface 2004. Second computer-readable medium 2006 provides the same or similar functionality as that described with reference to computer-readable medium 1808 of e-field controller 1801 though referring to appliance controller 1816. Second processor 2008 provides the same or similar functionality as that described with reference to processor 1810 of e-field controller 1801 though referring to appliance controller 1816.

Control application 2010 performs operations associated with controlling the operation of the appliance. For example, appliance controller 1816 of refrigerator 100 controls a flow of refrigerant through one or more refrigeration systems of refrigerator 100 where a refrigeration system cools air provided to one or more compartments. Refrigerator 100 may include one or more refrigeration systems. For illustration, a refrigeration system may include a compressor, a condenser, an expansion valve, a dryer, and/or an evaporator through which the refrigerant flows as well as various motors that control operation of the refrigeration system components. An air circulation system that includes a fan, an air duct, and/or a return duct may be associated with each compartment to provide cooled air from the associated evaporator to the enclosed space and to return air from the enclosed space to the associated evaporator to maintain the air in the enclosed space at the temperature selected using the associated temperature control.

In alternative embodiments, a plurality of appliance controllers may be included in the appliance that interface with zero or more e-field controllers. In the illustrative embodiment of FIG. 20, appliance controller 1816 interfaces with sensor controller A 1801a, sensor controller B 1801b, . . . , and sensor controller N 1801n to receive signals that indicate occurrence of a gesture to take an action. Each of sensor controller A 1801a, sensor controller B 1801b, . . . , and sensor controller N 1801n may be associated with an appliance component. More than one sensor controller may be associated with the same appliance component. In the illustrative embodiment of FIG. 20, appliance controller 1816 interfaces with a plurality of appliance components that may include a door opener 2014, a light 2016, a temperature control 2020, an ice dispenser 2022, water dispenser 200, and an ice type selector 2024. Door opener 2014, light 2016, temperature control 2020, ice dispenser 2022, water dispenser 200, and ice type selector 2024 may connect independently to appliance controller 1816 through a connector 2000 using a wire.

For example, sensor controller A 1801a may be connected to e-field sensor device 202 associated with water dispenser 200. When a user's presence gesture is received from sensor controller A 1801a, appliance controller 1816 sends a signal to water dispenser 200 to turn on. When the user's presence gesture is no longer received from sensor controller A 1801a, appliance controller 1816 sends a signal to water dispenser 200 to turn off. As another example, sensor controller B 1801b may be connected to foot freezer door open sensor 116 mounted on freezer door 102 of refrigerator 100. When a flick up gesture generated by a user's foot is received from sensor controller B 1801b, appliance controller 1816 sends a signal to door opener 2014 to open freezer door 102. When a flick down gesture generated by the user's foot is received from sensor controller B 1801b, appliance controller 1816 sends a signal to door opener 2014 to close freezer door 102.

The operations may be implemented using hardware, firmware, software, or any combination of these methods. Referring to the example embodiment of FIG. 20, control application 2010 is implemented in software (comprised of computer-readable and/or computer-executable instructions) stored in second computer-readable medium 2006 and accessible by second processor 2008 for execution of the instructions that embody the operations of control application 2010. Control application 2010 may be written using one or more programming languages, assembly languages, scripting languages, etc.

Figure 21:
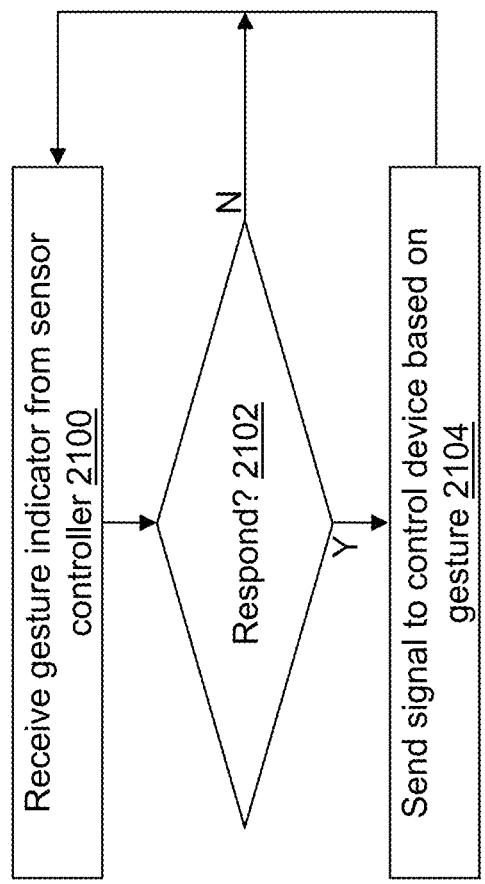
FIG. 21 depicts a flow diagram illustrating examples of operations performed by the appliance controller of FIG. 20 in accordance with an illustrative embodiment.

Referring to FIG. 21, example operations associated with control application 2010 are described. Additional, fewer, or different operations may be performed depending on the embodiment of control application 2010. The order of presentation of the operations of FIG. 21 is not intended to be limiting. Some of the operations may not be performed in some embodiments. Although some of the operational flows are presented in sequence, the various operations may be performed in various repetitions and/or in other orders than those that are illustrated.

In an operation 2100, a signal is received from e-field controller 1801 that indicates occurrence of a gesture in the sensing area of one of the e-field sensors mounted to the appliance.

In an operation 2102, a determination is made concerning whether to respond to the indicated occurrence of the gesture. When a response to the indicated occurrence of the gesture indicates an action by the associated appliance component, processing continues in an operation 2104. When a response to the indicated occurrence of the gesture does not indicate an action by the associated appliance component, processing continues in operation 2100 to wait for receipt of another signal from e-field controller 1801.

In operation 2104, a signal is sent to the associated appliance component to take the action indicated by the gesture performed by the user, and processing continues in operation 2100 to wait for receipt of another signal from e-field controller 1801.

Inclusion of e-field sensor device 1800 in an appliance supports replacement of knobs, buttons, dials, levers, toggle switches, etc. that require physical contact or force to indicate the desired user function and allows the user to control operation of the appliance while holding another item in their hand. Inclusion of e-field sensor device 1800 in an appliance further supports a simpler and more aesthetically pleasing appliance appearance. Cleaning of the appliance is much simpler because the user does not need to touch the appliance to control its operation or to access its interior, and the surface is flat without items that themselves must be cleaned and possibly removed to thoroughly clean the appliance.

In an illustrative embodiment, an e-field sensor was designed that included first e-field electrode 1406 and second e-field electrode 1408 that were 50 millimeters (mm) in length and third e-field electrode 1410 and fourth e-field electrode 1412 that were 75 mm in length, and that did not include fifth e-field electrode 1414. Transmitter electrode 1402 was approximately 50 mm by 75 mm. E-field controller 1801 and the illustrative e-field sensor were mounted on a PCB of four layer FR4 glass reinforced epoxy laminate also referred to as fiberglass and epoxy.

Figure 22B:
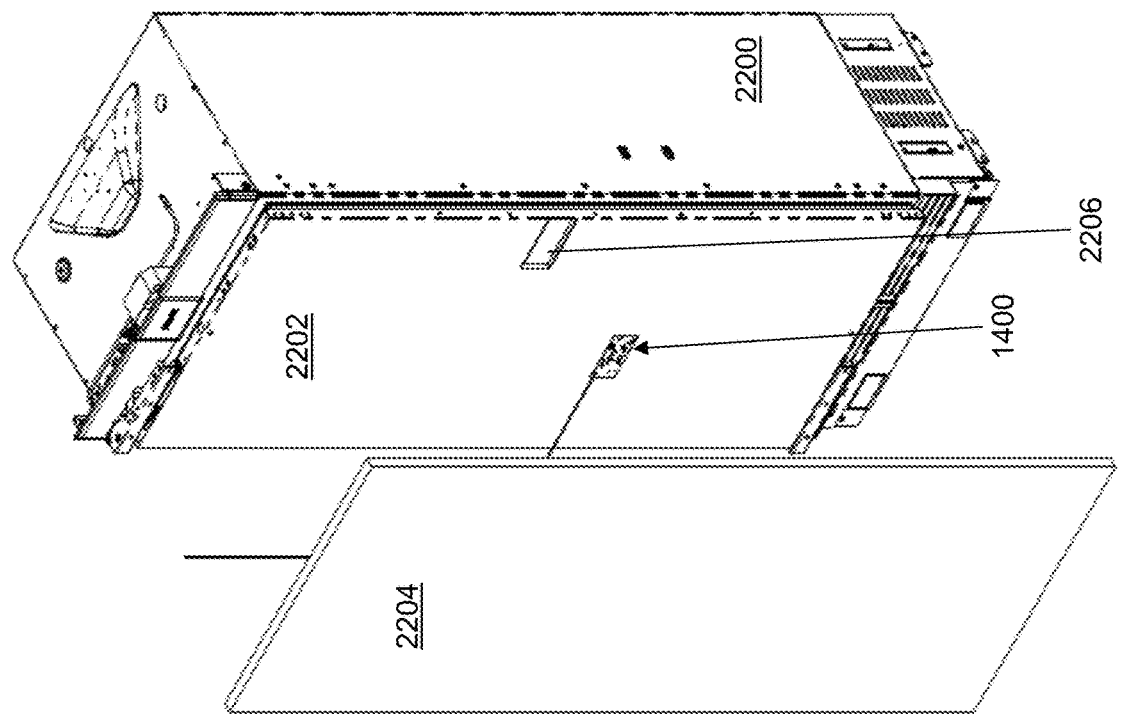
FIG. 22B depicts an illustrative sensor mounting in a refrigerator door in accordance with an illustrative embodiment.
Figure 22A:
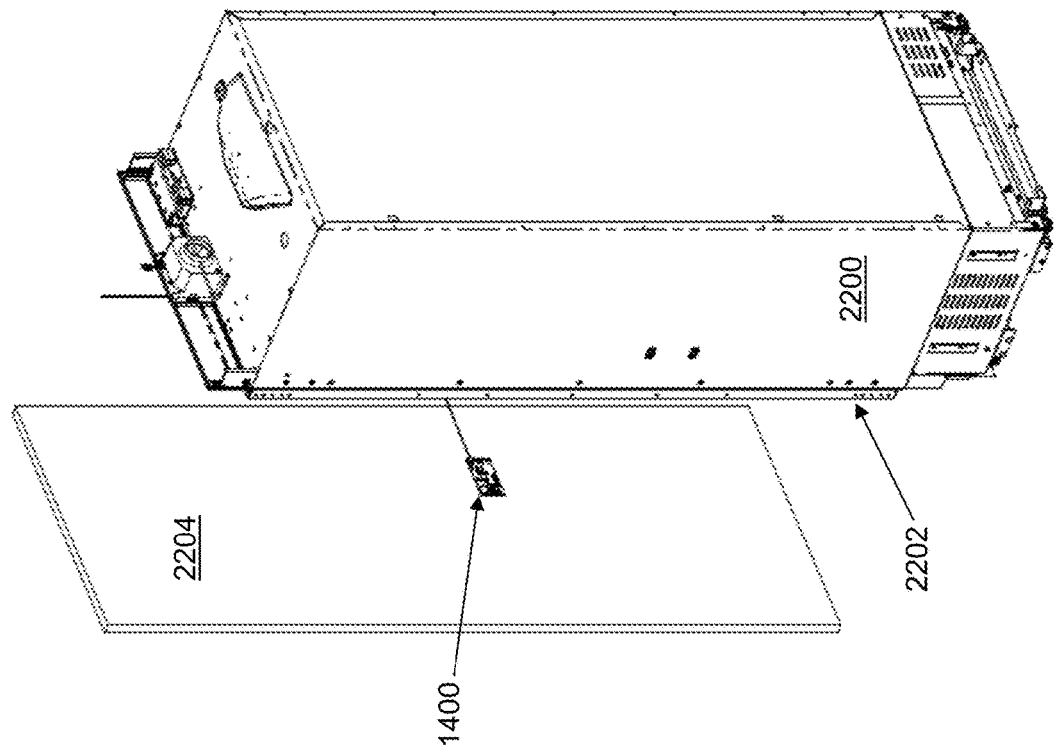
FIG. 22A depicts an illustrative sensor mounting in a door panel mounted to a refrigerator door in accordance with an illustrative embodiment.

Referring to FIG. 22A, e-field sensor 1400 is shown mounted in a door panel 2204 mounted to a refrigerator door 2202 of a refrigerator 2200 in accordance with an illustrative embodiment. A pocket (not shown) may be recessed into door panel 2204 while refrigerator door 2202 remains fully intact. Refrigerator door 2202 may be unfinished, where door panel 2204 is a decorative piece.

Referring to FIG. 22B, e-field sensor 1400 is shown mounted in refrigerator door 2202 of refrigerator 2200 in accordance with an illustrative embodiment. A pocket cutout 2206 may be formed, and e-field sensor 1400 mounted in refrigerator door 2202, where door panel 2204 mounts to refrigerator door 2202.

Within door panel 2204 or refrigerator door 2202, pocket cutout 2206 may be one-half inch (½") in depth and shaped and sized to accommodate isolation plate 1404. Dimensions for isolation plate 1404 may be, for example, 5" by 2.5". The electrodes may be mounted within a length horizontally of isolation plate 1404. Wires connect e-field controller 1801 to appliance controller 1816.

In alternative embodiment, e-field sensor 1400 may be placed anywhere within door panel 2204 or refrigerator door 2202 except within ½" of an edge of either to prevent any potential issue with gesturing too close to another unit that may be installed directly next to the unit such as in a French door style installation to create a space of at least 1" between two units door sensors. pocket cutout 2206 in either door panel 2204 or refrigerator door 2202 may be selected such that e-field sensor 1400 remains as forward as possible to be flush with a surface of the door panel 2204 or refrigerator door 2202, respectively, to maximize a distance refrigerator door or door panel can detect.

In yet another illustrative embodiment, a pocket may be recessed into refrigerator door 2202, and a recess also cut into door panel 2204. E-field sensor 1400 remains mounted in refrigerator door 2202, but the cutout in door panel 2204 removes additional material. Removing the additional material increases a sensor signal strength relative to not removing the material. The cutout in door panel 2204 may allow for ¼" of door panel 2204 material to remain between a front of e-field sensor 1400 and a front of door panel 2204.

E-field sensor 1400 may be positioned near a location of traditional handle when used for a door opening device or for opening a drawer of refrigerator 2200. In an under counter refrigerator, e-field sensor 1400 may be positioned near a top of the door panel or refrigerator door or near a bottom for activation by a foot instead of a hand. E-field controller 1801 may be integrated into a user interface board or on a separate PCB located in the main appliance user interface, in the door, or in the panel mounted to the door.

E-field sensor 1400 may be designed to respond when a user approaches refrigerator 2200 and uses their hand within 1" of the surface of door panel 2204 or refrigerator door 2202 where e-field sensor 1400 is located. E-field sensor 1400 may then be designed to respond when the user motions upward or downward at a rate that the hand crosses the entire face of e-field sensor 1400 in less than 300 milliseconds (ms) and no faster than 10 ms. E-field sensor 1400 then detects the motion and registers an upward or a downward swipe.

When the upward or the downward swipe is detected by e-field controller 1801, this information is communicated to appliance controller 1816. For example, when e-field sensor 1400 is used to open refrigerator door 2202, appliance controller 1816 verifies that it is a valid time to open, and, if so, commands the opening device to open refrigerator door 2202. Invalid times to open refrigerator door 2202 include: refrigerator door 2202 is already detected open, refrigerator door 2202 has recently closed within the last 500 ms, door opening locked, etc. The door opening distance may be based on the swipe motion. For example, up for partial open, down for full open.

For example, when e-field sensor 1400 is used to turn on an interior light of refrigerator 2200 that has a window in door to view internal contents, appliance controller 1816 verifies that it is a valid time to turn on the interior lights, and, if so, commands the light switch to turn on. Invalid times to turn on the light include, lights already on, feature disabled, etc.

For example, when e-field sensor 1400 is used to lock or unlock the door opening feature of refrigerator door 2202, a specific gesture sequence may be defined for this action. For illustration, an up-down-up sequence of gestures may lock the opening feature, and a down-up-down sequence of gestures may unlock the opening feature. The action may temporarily disable the door opening assist system, or appliance controller 1816 may command an electromechanical lock to activate to prevent the door from opening.

Usage of e-field sensor 1400 in an oven may be similar. Invalid times for opening the oven door may further include, when self-cleaning.

Usage of e-field sensor 1400 in a dishwasher may be similar where mounting options further include at a top of the dishwasher. Invalid times for opening the oven door may further include, when washing.

Usage of e-field sensor 1400 in a ventilation fan may include mounting facing downward towards a floor. A swipe left may turn on the fan, a swipe right may turn the fan off, a swipe up may increase the fan speed, and a swipe down may decrease the fan speed.

Use of directional terms, such as top, bottom, right, left, front, back, etc. are merely intended to facilitate reference to the various surfaces and elements of the described structures relative to the orientations shown in the drawings and are not intended to be limiting in any manner.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. An appliance comprising:
   an appliance component;
   a controller device comprising:
      an e-field sensor comprising
         a transmitter electrode formed of a first conductive material;
         an isolation layer formed of a dielectric material to at least partially cover the transmitter electrode;
         a first receive electrode formed on the isolation layer of a second conductive material; and
         a second receive electrode formed on the isolation layer of the second conductive material, wherein the second receive electrode is a mirror image of the first receive electrode on the isolation layer;
      a processor; and
      a computer-readable medium operably coupled to the processor, the computer-readable medium having computer-readable instructions stored thereon that, when executed by the processor, cause the controller device to
         send a transmit signal to the transmitter electrode for the transmitter electrode to radiate;
         receive a first signal from the first receive electrode in response to the radiated transmit signal;
         receive a second signal from the second receive electrode in response to the radiated transmit signal;
         detect when a gesture is performed by a user within a sensing area of the e-field sensor by comparing the received first signal to the received second signal;
         determine whether an appliance component that the e-field sensor is selected to control is responsive to the detected gesture; and
         when the appliance component is responsive to the detected gesture, send a control signal to the appliance component indicating that the appliance component perform an action associated with the detected gesture; and
   a panel comprising a front surface and a back surface, wherein the back surface is on an opposite side of the panel relative to the front surface, wherein the panel is formed of a non-metallic material,
   wherein the e-field sensor is mounted closer to the back surface of the panel than to the front surface, wherein the sensing area of the e-field sensor is located on a side of the panel closer to the front surface than to the back surface.

2. The appliance of claim 1, wherein a type of appliance is selected from the group consisting of a refrigerator, a dishwasher, an oven, a stove, a microwave, a cooktop, a ventilation hood, a stove, and a coffee maker.

3. The appliance of claim 1, wherein the first receive electrode is aligned vertically with the second receive electrode.

4. The appliance of claim 1, wherein the first receive electrode is aligned horizontally with the second receive electrode.

5. The appliance of claim 1, further comprising a door, wherein the panel is a door panel configured to mount to the door, wherein the e-field sensor is mounted in a pocket formed in the door, wherein the door panel includes a cutout formed partially through the back surface of the door panel, wherein the cutout aligns with the e-field sensor when the door panel and the e-field sensor are mounted to the door.

6. The appliance of claim 1, wherein determining whether the appliance component that the e-field sensor is selected to control is responsive to the detected gesture comprises:
   determining if a gesture direction satisfies a predefined gesture direction; and
   determining that it is a valid time for the appliance component to perform the action.

7. The appliance of claim 6, wherein determining whether the appliance component that the e-field sensor is selected to control is responsive to the detected gesture further comprises determining if a gesture speed satisfies a predefined gesture speed.

8. The appliance of claim 1, wherein the e-field sensor further comprises:
   a third receive electrode formed on the isolation layer of the second conductive material; and
   a fourth receive electrode formed on the isolation layer of the second conductive material, wherein the fourth receive electrode is a mirror image of the third receive electrode on the isolation layer.

9. The appliance of claim 8, wherein the first receive electrode is perpendicular to the third receive electrode on the isolation layer.

10. The appliance of claim 8, wherein the e-field sensor further comprises a fifth electrode formed on the isolation layer of the second conductive material, wherein the fifth receive electrode is bordered by the first receive electrode, the second receive electrode, the third receive electrode, and the fourth receive electrode.

11. The appliance of claim 1, wherein the appliance component is selected from the group consisting of a door, an appliance light, a temperature control, an ice dispenser, a water dispenser, a fan, an ice type selector, an operating mode selector, a grill cover, a coffee grinder, and a brew type selector.

12. The appliance of claim 1, wherein the gesture is selected from the group consisting of a swipe up of a user's body part, a swipe down of a user's body part, a swipe left of a user's body part, a swipe right of a user's body part, a clockwise rotation of a user's body part, and a counterclockwise rotation of a user's body part.

13. The appliance of claim 1, wherein the appliance component is a door, and the action is to open the door or to close the door.

14. The appliance of claim 1, wherein the appliance component is a light, and the action is to turn on the light or to turn off the light.

15. The appliance of claim 1, wherein the appliance component is a temperature control, and the action is to increase the temperature setting of the temperature control or to decrease the temperature setting of the temperature control.

16. The appliance of claim 1, wherein the appliance component is a fan, and the action is to turn on the fan, to turn off the fan, to increase a fan speed, or to decrease the fan speed.

17. The appliance of claim 1, wherein the appliance component is an operating mode selector, and the action is to select an operating mode.

18. The appliance of claim 1, further comprising:
a plurality of walls; and
a door mounted to a wall of the plurality of walls to provide access to an enclosed space defined by the plurality of walls and the door when the door is in a closed position, wherein the front surface of the panel is on an exterior of the door that is exterior of the enclosed space.

19. The appliance of claim 1, further comprising a top wall, wherein the front surface of the panel is in a user interface area of an exterior of the top wall.

20. The appliance of claim 1, further comprising a front wall, wherein the front surface of the panel is in a user interface area of an exterior of the front wall.

* * * * *